(12) United States Patent
Pobbathi et al.

(10) Patent No.: US 9,268,859 B2
(45) Date of Patent: Feb. 23, 2016

(54) METHOD AND SYSTEM FOR CUSTOMIZING A WEB SITE

(71) Applicant: Yahoo! Inc., Sunnyvale, CA (US)

(72) Inventors: Nageswara Pobbathi, San Jose, CA (US); Yi Chang, Milpitas, CA (US); Anlei Dong, Fremont, CA (US); Bo Long, Mountain View, CA (US); Vignesh Murugesan, Foster City, CA (US); Chi-Chung Chan, Daly City, CA (US)

(73) Assignee: YAHOO! INC., Sunnyvale, CA (US)

( * ) Notice: Subject to any disclaimer, the term of this patent is extended or adjusted under 35 U.S.C. 154(b) by 99 days.

(21) Appl. No.: 13/647,581

(22) Filed: Oct. 9, 2012

(65) Prior Publication Data

US 2013/0097158 A1    Apr. 18, 2013

Related U.S. Application Data

(60) Provisional application No. 61/546,959, filed on Oct. 13, 2011.

(51) Int. Cl.
*G06F 17/30* (2006.01)
(52) U.S. Cl.
CPC ............................... *G06F 17/30867* (2013.01)
(58) Field of Classification Search
CPC ................................................. G06F 17/30867
USPC ......................................................... 707/707
See application file for complete search history.

(56) References Cited

U.S. PATENT DOCUMENTS

| | | | |
|---|---|---|---|
| 7,392,278 B2 | 6/2008 | Chen et al. | |
| 7,536,433 B2 | 5/2009 | Reilly | |
| 7,801,876 B1 | 9/2010 | Riley | |
| 2002/0002586 A1* | 1/2002 | Rafal et al. | 709/205 |
| 2005/0165753 A1* | 7/2005 | Chen et al. | 707/3 |
| 2005/0216434 A1* | 9/2005 | Haveliwala et al. | 707/1 |
| 2010/0076863 A1 | 3/2010 | Golomb | |

OTHER PUBLICATIONS

International Search Report corresponding to PCT/US2012/059637 dated Mar. 15, 2013.
Office Action issued on Aug. 7, 2014 in Taiwanese Application No. 101137618.
Office Action issued on Jul. 1, 2015 in Taiwanese Application 101137618.

* cited by examiner

*Primary Examiner* — Kris Mackes
(74) *Attorney, Agent, or Firm* — Pillsbury Winthrop Shaw Pittmann LLP

(57) ABSTRACT

Method, apparatus, and programs for customizing a web site are provided. In one example, a method for customizing a web site is provided. One or more representations corresponding to one or more customizable components of a web site are provided. The one or more representations are to be displayed on a display screen to a user. An input entered by the user and directed to a specific customizable component of the web site is received. How to customize the specific customizable component of the web site is determined based on the input. An instruction is generated with respect to the customizable component. The instruction is used to implement customization of the specific customizable component of the web site in accordance with the input from the user.

30 Claims, 15 Drawing Sheets

Exemplary experimental results (MSE) using the dynamic prediction model

| | Time Window based Moving Average | TWDLR | Improvement |
|---|---|---|---|
| k = 5 | 1.3424147604 | 0.509052619737 | 62.1% |
| k = 8 | 1.33156789643 | 0.504724647819 | 62.1% |
| k = 10 | 1.36289279833 | 0.506698150266 | 62.8% |

FIG. 9

METHOD AND SYSTEM FOR CUSTOMIZING A WEB SITE

CROSS-REFERENCE TO RELATED APPLICATIONS

The present application claims priority to U.S. Provisional Application Ser. No. 61/545,959 filed Oct. 13, 2011 entitled "METHOD AND SYSTEM FOR CUSTOMIZING A WEB SITE," which is incorporated herein by reference in its entirety.

BACKGROUND

1. Technical Field

The present teaching relates to methods, systems, and programming for Internet services. Particularly, the present teaching relates to methods, systems, and programming for customizing a web site.

2. Discussion of Technical Background

Search is a commonly used feature on every web site, and users expect high quality results and experience from it. However, search is a very hard technological and scientific problem for most online publishers, who do not have existing core competency in search or the resources to build one. Making it even more challenging is that the search needs vary by publisher verticals and even from one publisher to another within the same vertical. For example, the web site search needs for a news publisher are different from that of an online forum site or an online shopping merchant. Plus each web site would like to have a search experience that is consistent with the look and feel of their web site.

Domain-specific search (also known as vertical search) solutions focus on one specific area of knowledge and create customized search experiences. Because of the domain's limited corpus and clear relationships between concepts, domain-specific search solutions provide extremely relevant results for searchers. The content domain or the vertical content area may be based on topicality, media type, or genre of content. Common verticals include shopping, automotive industry, legal information, medical information, and travel. In contrast to general web search engines, which attempt to index large portions of the World Wide Web using a web crawler, vertical search engines typically use a focused crawler that attempts to index only web pages that are relevant to a predefined topic or set of topics.

Some known solution offers users a partially customizable version of its web search service. The solution is based on general web search index and web search ranking. So, customers get a slice of web search rather than the domain-specific (vertical) search. In addition, the known solution does not have the ability for partners to influence ranking through promotions. Another known solution is mainly positioned as a search service for corporate sites. This solution uses partner content instead of general web search index, but the ranking is not based on the vertical. None of these known solutions offer the ability for the partner to customize the web site to include promotions and paid inclusions as part of the results.

Therefore, there is a need to provide a solution for customizing a web site with an improved domain-specific search capability.

SUMMARY

The present teaching relates to methods, systems, and programming for Internet services. Particularly, the present teaching relates to methods, systems, and programming for customizing a web site.

In one example, a method for customizing a web site is provided. One or more representations corresponding to one or more customizable components of a web site are provided. The one or more representations are to be displayed on a display screen to a user. An input entered by the user and directed to a specific customizable component of the web site is received. How to customize the specific customizable component of the web site is determined based on the input. An instruction is generated with respect to the customizable component. The instruction is used to implement customization of the specific customizable component of the web site in accordance with the input from the user.

In another example, a method for customizing a web site is provided. A web site having one or more customizable components is provided. The web site is to be displayed on a display screen to a user with the one or more customizable components capable of being customized by a user. Information associated with the one or more customizable components is sent. An instruction generated based on an input entered by the user is received. The instruction is directed to a specific customizable component of the web site. The web site on the display screen is rendered to the user in accordance with the instruction so that the specific customizable component is customized based on the input from the user. The input from the user specifies a desired customization with respect to the specific customizable component and is used to determine how to generate the instruction. The instruction is to be used to implement the customization of the specific customizable component in accordance with the user's input.

In still another example, a system for customizing a web site is provided. The system includes a user input analyzer and a user input analyzer. The user input analyzer is configured to provide one or more representations corresponding to one or more customizable components of a web site. The one or more representations are to be displayed on a display screen to a user. The user input analyzer is also configured to receive an input entered by the user and directed to a specific customizable component of the web site and determine how to customize the specific customizable component of the web site based on the input. The customizing instruction generator is configured to generate an instruction with respect to the customizable component. The instruction is used to implement customization of the specific customizable component of the web site in accordance with the input from the user.

Other concepts relate to software for customizing a web site. A software product, in accordance with this concept, includes at least one machine-readable non-transitory medium and information carried by the medium. The information carried by the medium may be executable program code data regarding parameters in association with a request or operational parameters, such as information related to a user, a request, or a social group, etc.

In yet another example, a machine readable and non-transitory medium having information recorded thereon for customizing a web site, wherein the information, when read by the machine, causes the machine to perform a series of steps. One or more representations corresponding to one or more customizable components of a web site are provided. The one or more representations are to be displayed on a display screen to a user. An input entered by the user and directed to a specific customizable component of the web site is received. How to customize the specific customizable component of the web site is determined based on the input. An instruction is generated with respect to the customizable component. The instruction is used to implement customization of the specific customizable component of the web site in accordance with the input from the user.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is a depiction of an exemplary experimental result using a dynamic prediction model, according to an embodiment of the present teaching.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present teaching describes method, system, and programming aspects of web site customization with an improved domain-specific search capability to provide a better user experience on the web site. Such method and system benefit users in several ways. For example, users of the web site get a web-scale product that is customizable to provide a unique experience. The customization is not just skin-deep as users get vertical specific ranking that they can influence as well. In additions, the user can also monetize better through promotions and paid inclusions.

Figure 1A:
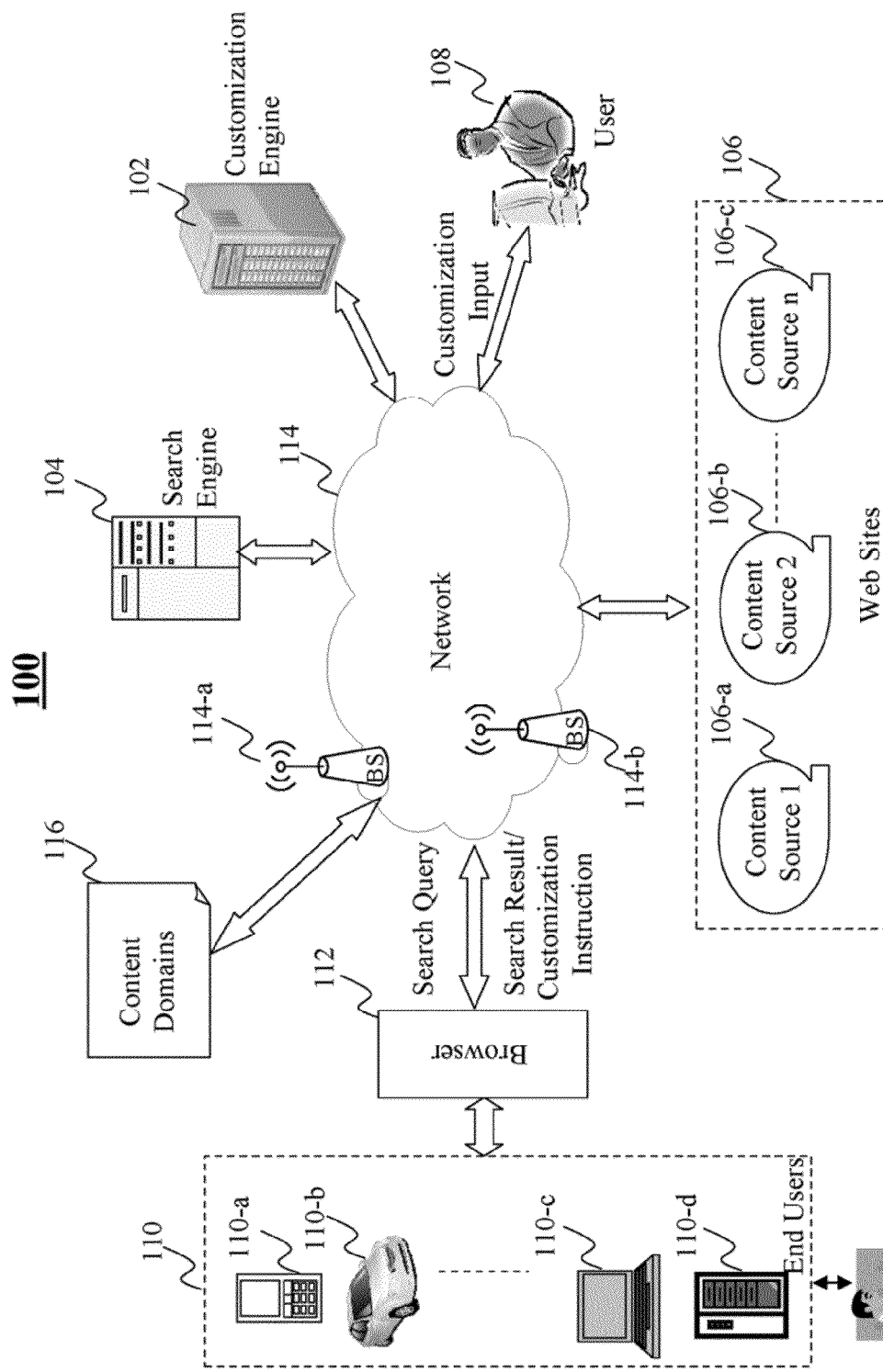
FIGS. 1(a)-1(f) depict exemplary embodiments of a networked environment in which web site customization is applied, according to various embodiments of the present teaching.
Figure 1B:
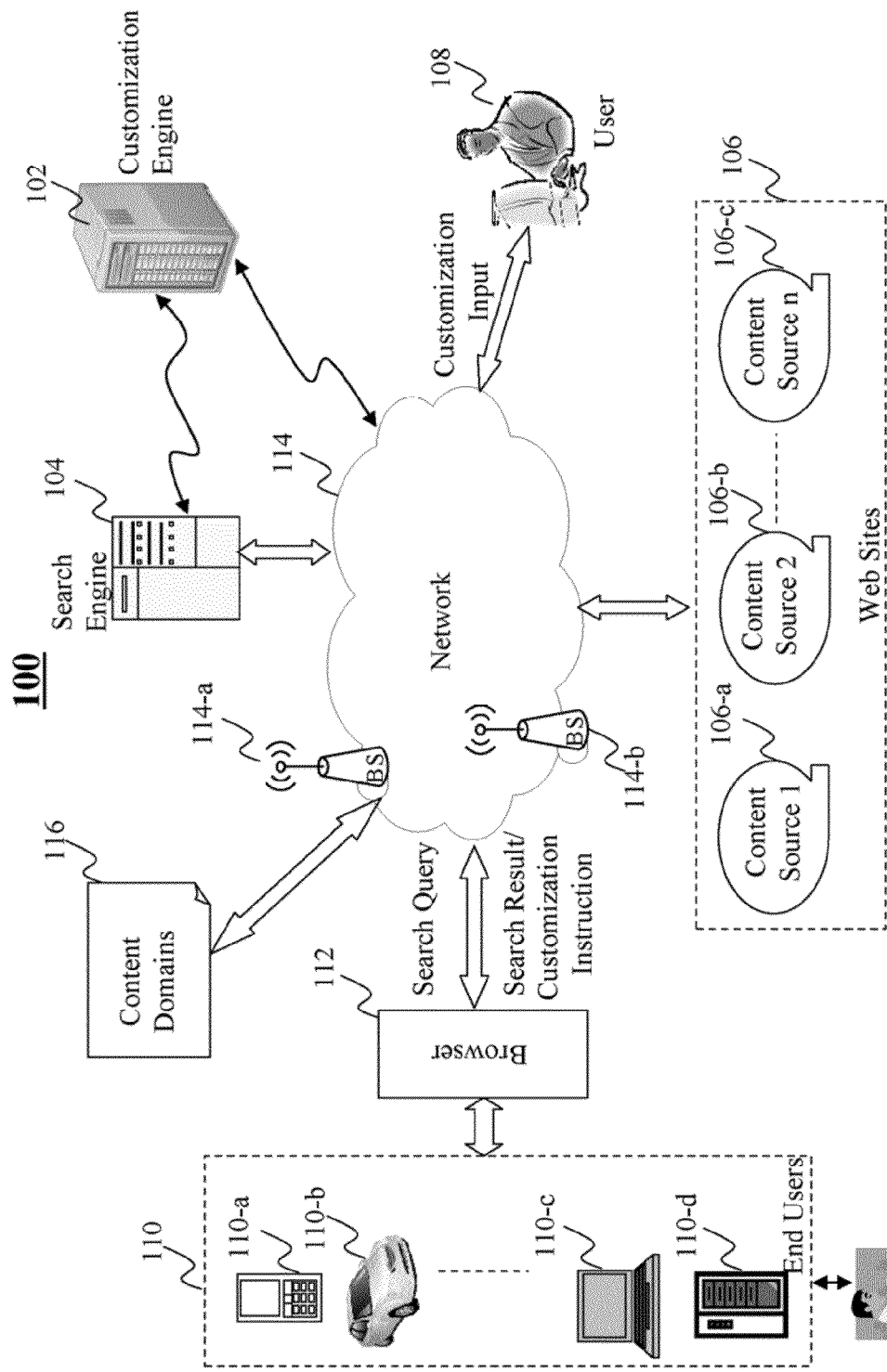
Figure 1C:
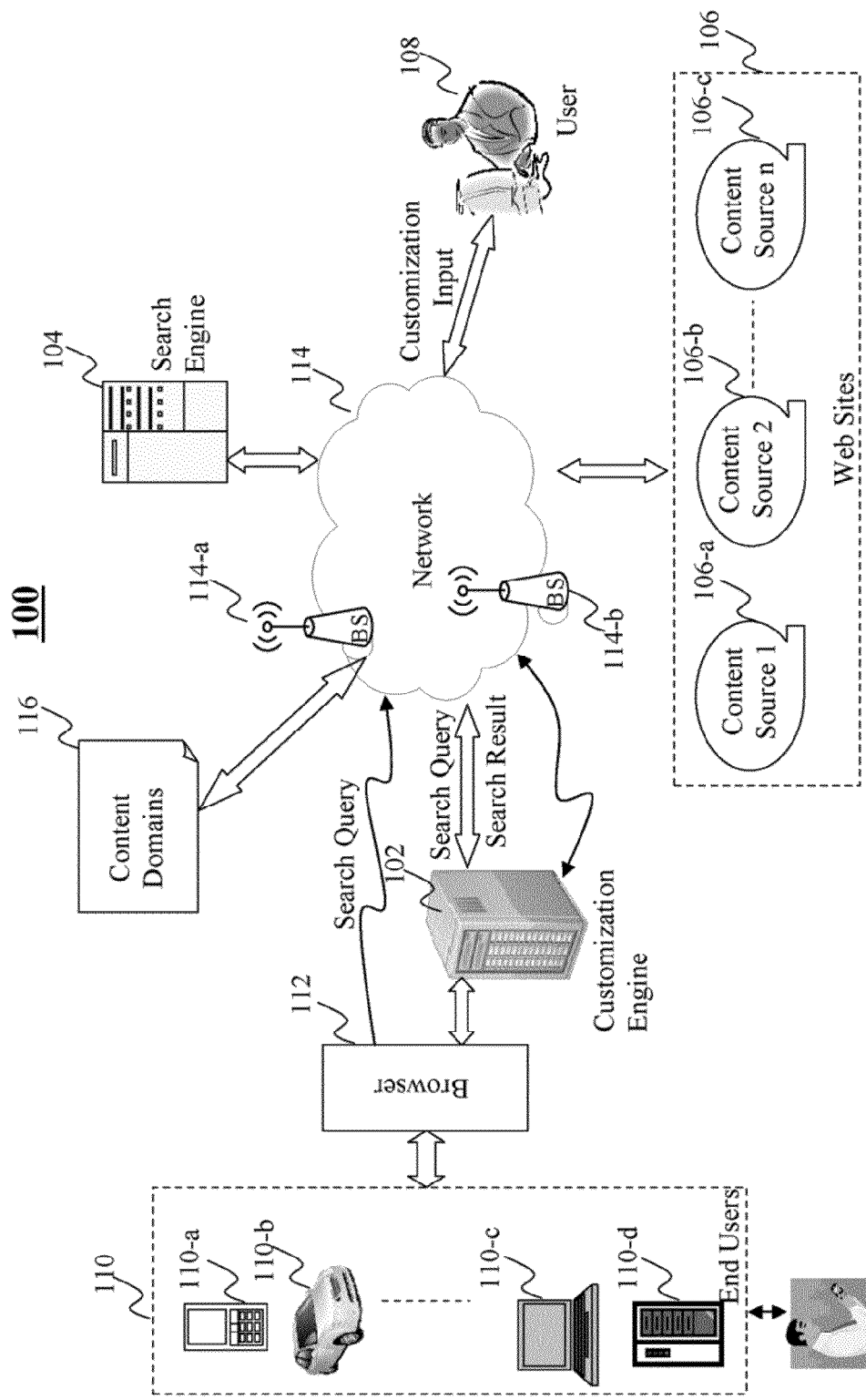
Figure 1D:
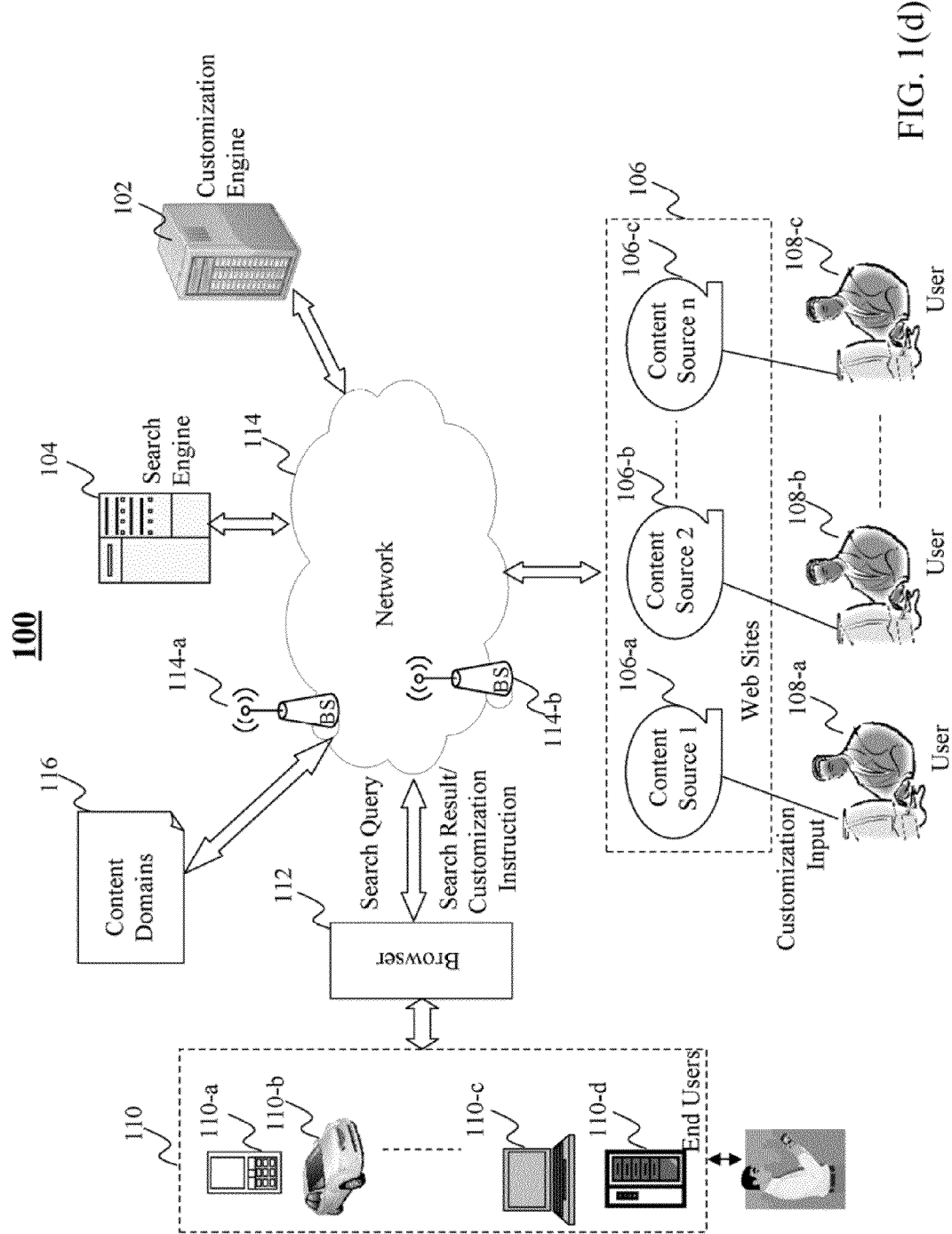
Figure 1E:
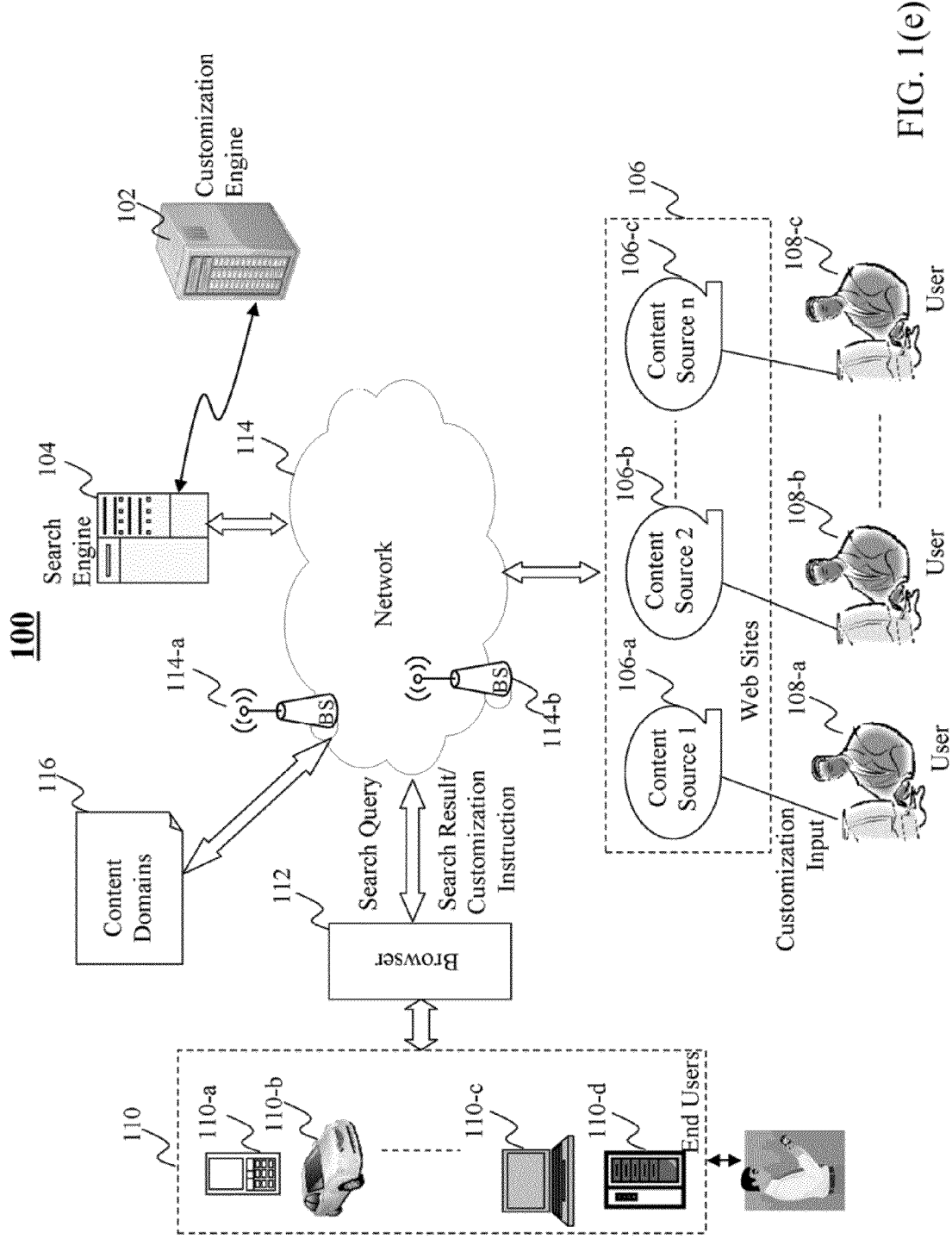
Figure 1F:
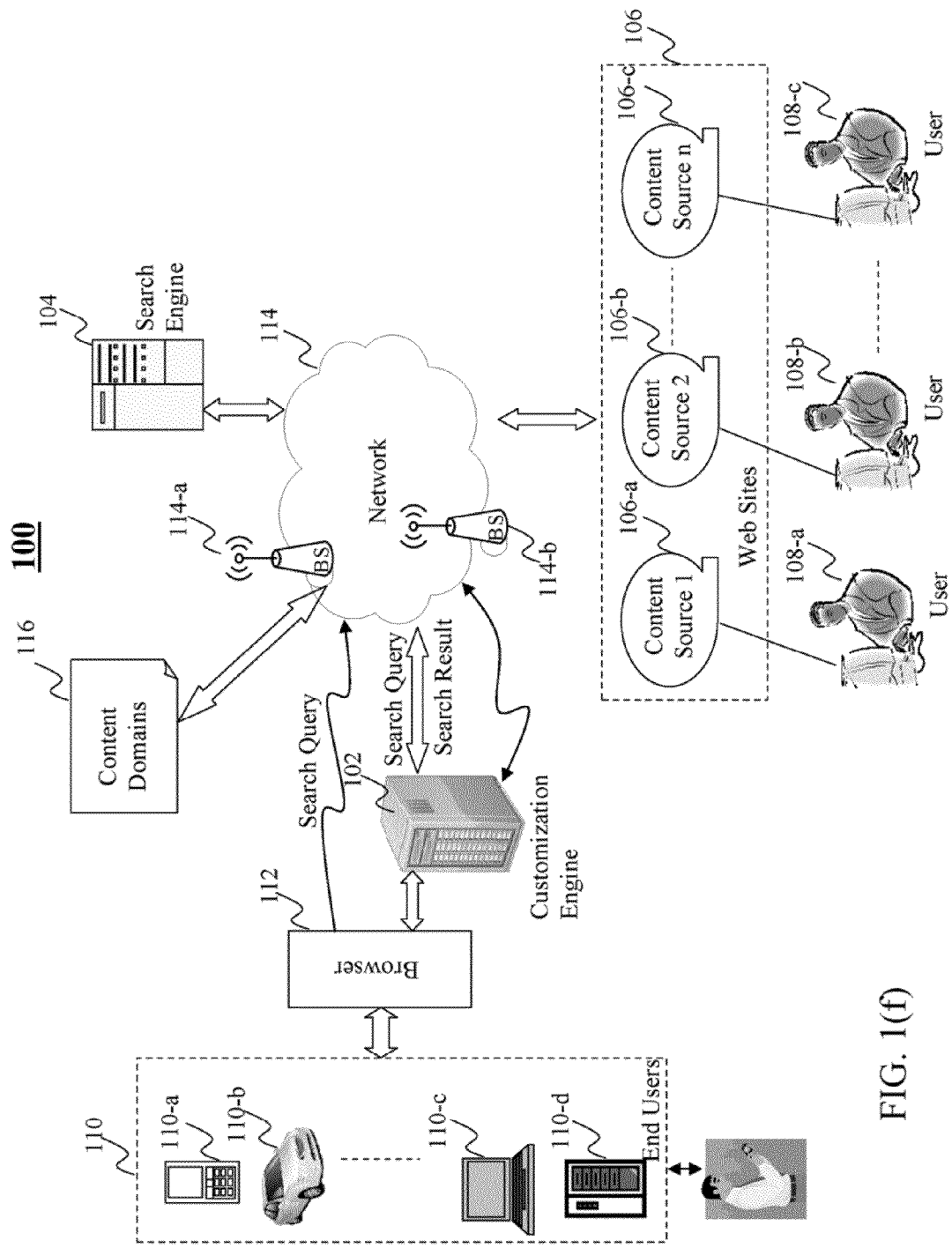

FIGS. 1(a)-1(f) depict exemplary application embodiments of a networked environment 100 in which web site customization is applied. In FIG. 1(a), the networked environment 100 includes a customization engine 102, a search engine 104, web sites 106 having one or more content sources 106-a . . . 106-c, users 108, end users 110, browsers 112 used by the end users 110 for accessing the web sites 106, network 114, and classified content domains 116. The network 114 may be a single network or a combination of different networks. For example, a network 114 may be a local area network (LAN), a wide area network (WAN), a public network, a private network, a proprietary network, a Public Telephone Switched Network (PSTN), the Internet, a wireless network, a virtual network, or any combination thereof. A network 114 may also include various network access points, e.g., wired or wireless access points such as base stations or Internet exchange points 114-a, . . . , 114-b, through which a data source may connect to the network 114 in order to transmit information via the network 114.

The web sites 106 include multiple content sources 106-a, 106-b, . . . , 106-c. A content source may correspond to a web page host of an entity, whether an individual, a business, or an organization such as USPTO.gov, a content provider such as cnn.com and Yahoo.com, or a content feed source such as tweeter or blogs. Both the search engine 104 and the customization engine 102 may access information from any of the content sources 106-a, 106-b, . . . , 106-c and rely on such information to respond to a query (e.g., the search engine 104 identities content related to keywords in the query and returns the result to an end user 110).

The users 108 may customize the web sites 106 by sending customization input to the customization engine 102 via the network 114. The user 108 may be a host of the web site 106, a content provider offering content through the web site 106, a service provider providing search service on the web site 106, an end user viewing content on the web site 106, or an end user searching for content on the web site 106. In other words, the user 108 may have a maximum control over the web site 106 (e.g., a web site host), a medium control over the web site 106 (e.g., a content/service provider), or a minimum control over the web site (e.g., an end user of the web site). Accordingly, the level of customization of the web site 106 may vary depending on the type of the users 108 who want to customize the web sites 106. The customization engine 102 may interface with different types of users 108, who can customize a web site 106 in a way they see fit, whether this user 108 is a partner, an end user, or someone in-between (e.g., an advertiser who can insert its advertisement into a web page and can have limited capacity to customize only a sub-space of a web site that is assigned to the advertiser). However, depending on the type of the user 108 (e.g., an end user, advertiser, or partner), their abilities as to how much they can customize may be restricted in different ways. In FIG. 1(a), the users 108 have only minimum control over the web site.

The end users 110 may be of different types such as users connected to the network via desktop connections (110-d), users connecting to the network via wireless connections such as through a laptop (110-c), a handheld device (110-a), or a built-in device in a motor vehicle (110-b). An end user 110 may access the web site 106 by sending a search query to the search engine 104 using the browser 112 via the network 114 and by receiving a search result from the search engine 104 through the network 114. If the web site 106 that the end user 110 is selected to access has been customized by the customization engine 102 in accordance with the customization input from the user 108, the customization engine 102 generates a customization instruction based on the determined customization information and/or the profile of the end user 110 and sends the instruction to the browser 112 such that the browser 112 may render the customized web site accordingly for display.

When the end user 110 sends a search query to search content on the web sites 10, the search engine 104 performs the search and returns the search result to the end user 110. The search may be customized at different levels, for example, at the user interface level, functionality level, scope level, search scheme level, etc. The search may be performed by a general web search engine or a content-specific (vertical) search engine based on one content domain or a set of classified content domains. The search result may be ranked and presented to the end users 110. The ranking of the search result may also be customized by the user 108. In this example, the search engine 104 and customization engine 102 are separate and communicate with each other through the network 114.

FIG. 1(*b*) presents a similar networked environment as what is shown in FIG. 1(*a*) except that the search engine 104 and customization engine 102 are not separate and communicate with each other directly. That is, the customization engine 102 may control the customization of the search engine 104 directly.

FIG. 1(*c*) presents another similar networked environment as what is shown in FIG. 1(*a*) except that the customization engine 102 interacts with the browser 112 directly. That is, the search result may be filtered by the customization engine 102 based on the customization instruction in accordance with the customization input. The rendering of the customized web site is done by the customization engine 102 directly instead of by the browser 112.

FIG. 1(*d*) presents still another similar networked environment as what is shown in FIG. 1(*a*) except that the users 108 are the hosts of the web sites 106 and may customize their own web sites 106 for the end users 110. FIG. 1(*e*) presents a similar networked environment as what is shown in FIG. 1(*b*) except that the users 108 are the hosts of the web sites 106 and may customize their own web sites 106 for the end users 110. FIG. 1(*f*) presents a similar networked environment as what is shown in FIG. 1(*c*) except that the users 108 are the hosts of the web sites 106 and may customize their own web sites 106 for the end users 110. It is noted that different configurations as illustrated in FIGS. 1(*a*)-1(*f*) may also be mixed in any manner that is appropriate for a particular application scenario.

Figure 2:
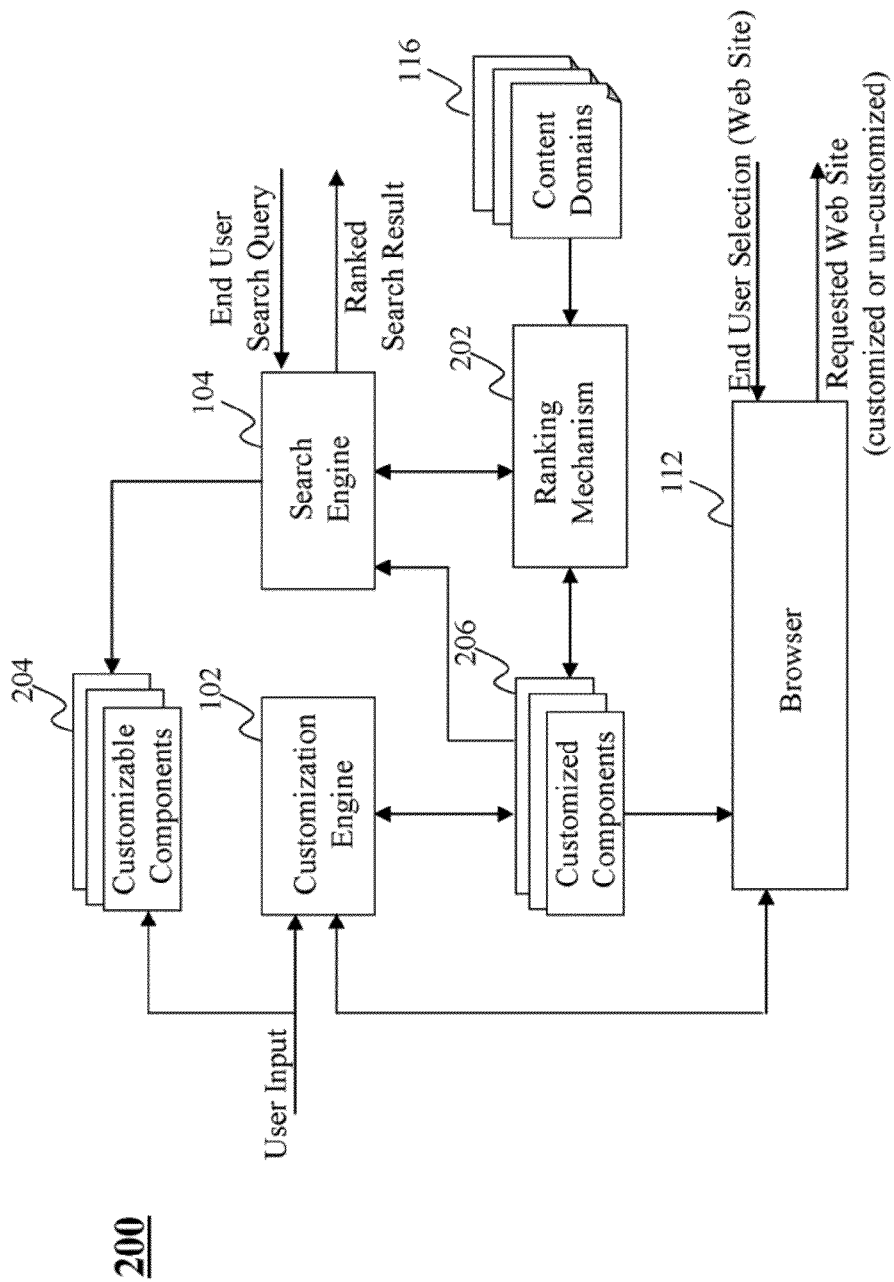
FIG. 2 is a high level exemplary system diagram of a system for customizing a web site, according to an embodiment of the present teaching.

FIG. 2 is a high level exemplary system diagram of a system 200 for customizing a web site, according to an embodiment of the present teaching. In addition to the components that have been introduced in FIGS. 1(*a*)-(*f*), the system 200 may also include a ranking mechanism 202 for ranking the search result and one or more customizable components 204 that may be determined based on a user input. Each customizable component 204 may also be specified as to one or more selectable customization schemes, and such schemes or choices of customization may be presented to a user so that the user may select an appropriate customization in a relevant context. The selected customization with respect to each customizable component 204 may be implemented or realized by the customization engine 102 to output customized components 206. The customized components 206 may be used to generate a customized web site in response to an end user's selection of the web site via the browser 112. The requested web site, either customized or un-customized, is then rendered by the browser 112 and displayed to the end user as a response to the end user's selection.

In one embodiment, the end user may also send a search query to the search engine 104 to perform a general or vertical search. The search result may be ranked by the ranking mechanism 202 on one or more content domains 116. The customized components 206 may include a component for customizing the search and/or ranking.

Figure 3:
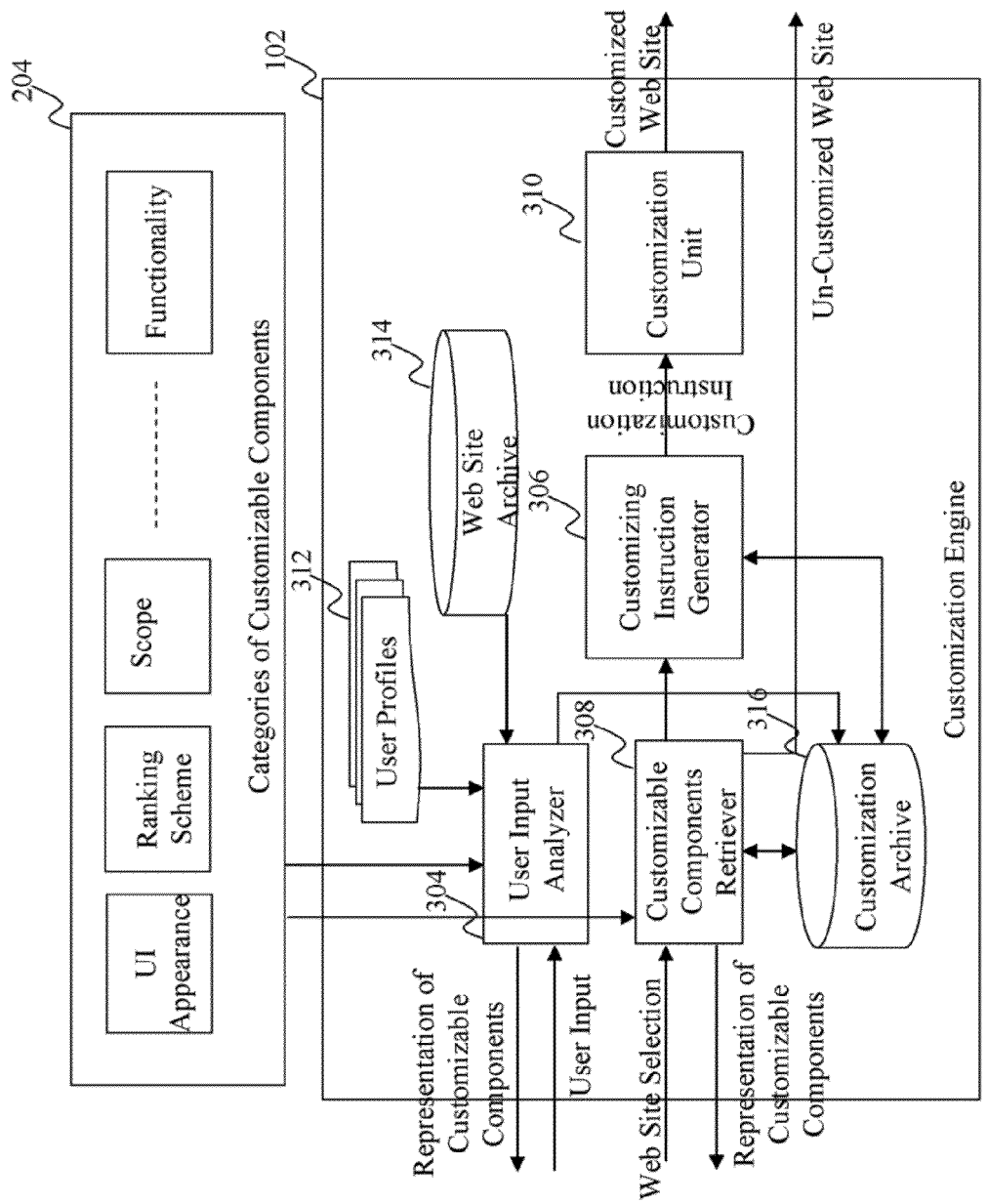
FIG. 3 is a system diagram of an exemplary customization engine of the system for customizing a web site shown in FIG. 2, according to an embodiment of the present teaching.

FIG. 3 depicts an exemplary diagram of the customization engine 102 and categories of customizable components 204, according to an embodiment of the present teaching. The one or more customizable components 204 of the web site in this example include at least one category of appearance of a user interface associated with the web site, scheme in which search result associated with the web site is to be ranked, scope associated with a web site, and functionalities which may be customized. The category of scheme in which search result associated with the web site is to be ranked includes revising an existing ranking derived with respect to an item included in the search result. The category of appearance of a user interface associated with the web site may include, for example, color scheme of the web site, font scheme of the web site, format of the web site, and language of the web site. In one example, user profiles 312 may store any suitable information related to the end user (e.g., demographic information, geographical information, online activity history, etc.), and hardware (e.g., desktop or laptop computer, tablet, smartphone, TV, game console, etc.) and software (e.g., operating system, browser, etc.) used by the end user to access the web site. Web site archive 314 may store any suitable information related to the web site, such as language, suggested display resolution, etc. The information in the user profiles 312 and web site archive 314 may be used to provide suitable appearance of a user interface. For example, a user may customize the appearance of a user interface based on whether the end user is using desktop, smartphone, tablet, TV, game console, the aspect ratio of the screens, the browser on each screen, as well as based on the implicit understanding of the location of the end user. In other words, the customization may be achieved based on the end user profiles. In one example, depending on the screen size of the end user's device, the customized web site may respond at different speeds and change the number of rich display modules. In another example, depending on the input mechanism by which the end user uses to access the web site (e.g., touch screen, mouse, TV remote controller, game console, etc.), the navigation method of the page change of the web site may be customized. In still another example, depending on whether the end user's device provides a lean-back or lean forward experience, the user interface of the web site and search/ranking may be adjusted. For example, tablets are typically considered as lean-back experience, so the search is richer and brows-like instead of showing the result as links in the desktop mode. In yet another example, the location of the end user becomes important in mobile devices as compared to desktop devices.

The category of scope associated with a web site may include, for example, content scope and search scope. In this example, the content scope includes one or more content sources on the web site, and the search scope includes one or more content domains 116 serving as sources of content for search through the web site. For the former, a user may customize by, e.g., removing certain categories of content that is originally scheduled to be displayed (e.g., a user who is not interested in weather information on Yahoo! home page). For the latter, a user may customize by, e.g., restricting the search of content from only certain sources (e.g., restrict the search not to include content from sina.com). In this example, the category of functionalities which may be customized includes, for example, a search suggestion, a first search result that is considered to relate to a second search result, a capability of customizing a subspace on the web site, a search result filtered based on one or more criteria (e.g., user profile, online activity, search history, etc.), a sponsored link and/or a paid inclusion, and a promotion displayed on the web site. It is understood that any other suitable categories of customizable components may also be included.

In this example, the customization engine 102 includes a user input analyzer 304, a customizing instruction generator 306, a customizable components retriever 308, a customization unit 310, user profiles 312, a web site archive 314, and a customization archive 316. The user input analyzer 304 may send representations of customizable components to the user for selecting one or more customizable components 204. The representations are to be displayed on a display screen of the user. Each of the representations corresponding to a customizable component 204 is rendered on the display screen to include one or more selectable choices, each of which represents one way to customize the customizable component 204. The user input analyzer 304 then receives an input from the user (e.g., host or content/service provider of the web site) directed to a specific customizable component 204 of the web site. The input from the user corresponds to a selected choice made by the user as to how to customize the specific customizable component 204. The user input analyzer 304 in conjunction with the user profiles 312 and web site archive 314 may determine how to customize the specific customizable component 204 of the web site based on the input and then store the result into the customization archive 316. The user profiles 312 may store any suitable information that identifies the end users. The web site archive 314 may store any suitable information related to the web site. The information in the user profiles 312 and web site archive 314 may be considered by the user input analyzer 304 in determining the suitable customizable components 204. For instance, an end user may be able to customize a web site by removing certain functionalities that are not essential to the web site owner, e.g., on a search engine, an end user is allowed to customize preferred sponsor's links but is not allowed to completely remove sponsor's links. As another example, an advertiser who is given a limited space to display an advertisement may customize the interior display of the advertisement but not allowed to customize any space outside of the given limited space. The above-mentioned example may be categorized as an "offline" customization of the web site, performed by, for example, the host of the web site.

Once the web site is selected by an end user (e.g., via receiving a search query), the customizable components retriever 308 retrieves suitable customization information (e.g., specific customizable component of the web site) and causes the customizing instruction generator 306 to generate an instruction with respect to the customizable component 204. The instruction is used to implement customization of the specific customizable component 204 of the web site in accordance with the input from the user. If no suitable customization information is retrieved, an un-customized web site may be rendered and displayed on the screen of the end user. If suitable customization information is retrieved, the customization unit 310 then, in accordance with the customizing instruction, renders the web site on the display screen to the end user. In other examples, customization unit 310 may transmit the instruction to a destination (e.g., browser of the end user) where the web site is rendered with customization in accordance with the instruction.

In another embodiment, an "online" customization may be performed. For example, the users who want to customize the web site may be the end users instead of the host of the web site. The customizable components retriever 308 may send the representations of customizable components 204 to the end user and receive the customization input along with the web site selection. Since the customization information is not previously stored, the customizable components retriever 308 does not search the customization archive 316 but instead, search for the available customizable components 204 directly.

Figure 4:
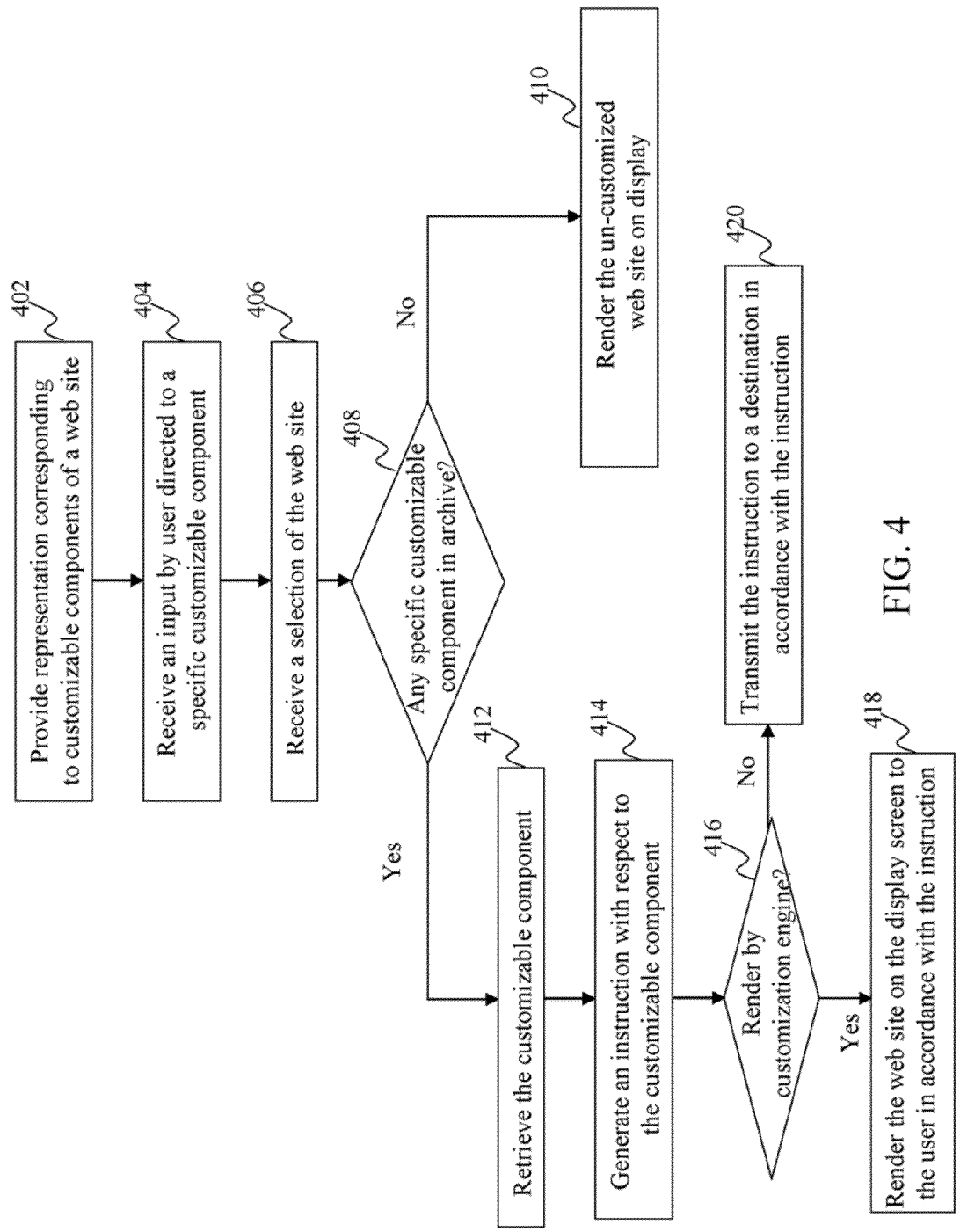
FIG. 4 is a flowchart of an exemplary process of customizing a web site, according to an embodiment of the present teaching.

FIG. 4 is a flowchart of an exemplary process in which web site customization is performed, according to an embodiment of the present teaching. It will be described with reference to the above figures. However, any suitable module or unit may be employed. Beginning at block 402, one or more representations corresponding to one or more customizable components of a web site are provided to a user, for example, by the user input analyzer 304. The one or more representations are to be displayed on a display screen to the user. At block 404, an input entered by the user and directed to a specific customizable component of the web site is received, for example, by the user input analyzer 304. Moving to block 406, a selection of the web site is received from an end user, for example, by the customizable components retriever 308. In response to the selection, at block 408, whether there is any specific customizable component in the customization archive 316 is determined. If there is no any specific customizable component in the archive, then the process continues to block 410, where the un-customized web site is rendered on display for the end user. If it is determined that there are one or more customizable components in the archive at block 408, then at block 412, the customizable components are retrieved, for example, by the customizable components retriever 308 from the customization archive 316. Moving to block 414, an instruction with respect to the customizable components is generated, for example, by the customizing instruction generator 306. At block 416, whether the customized web site is rendered by the customization engine 102 is determined. If the customization engine 102 is used to render the customized web site, then at block 418, the web site is rendered by the customization unit 310 on the display screen to the user in accordance with the instruction. Otherwise, at block 420, the instruction is transmitted to a destination, for example, the end user's browser, in accordance with the instruction. The web site then may be rendered at the destination, e.g., the end user's browser, in accordance with the instruction.

Figure 5:
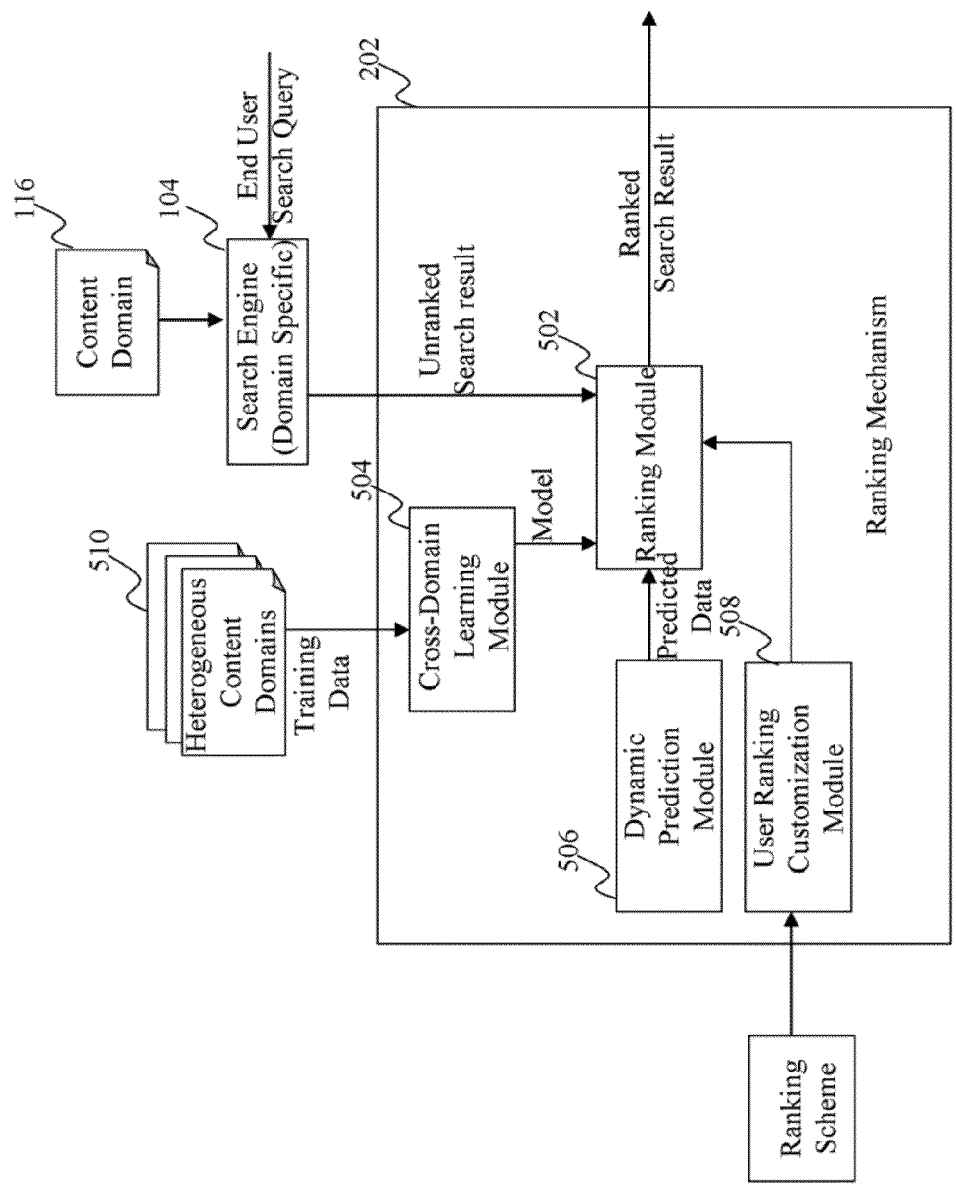
FIG. 5 is a system diagram of an exemplary ranking mechanism of the system for customizing a web site shown in FIG. 2, according to an embodiment of the present teaching.

FIG. 5 depicts an exemplary diagram of the ranking mechanism 202, according to an embodiment of the present teaching. In this example, the ranking mechanism 202 includes a ranking module 502, a cross-domain learning module 504, a dynamic prediction module 506, and a user ranking customization module 508. The ranking module 502 is operatively coupled to the search engine 104, the cross-domain learning module 504, the dynamic prediction module 506, and the user ranking customization module 508. The ranking module 502 is configured to receive the unranked search result generated by the search engine 104 in response to an end user's search query and to rank the search result in accordance with the various ranking models and/or customized ranking schemes based on a customization instruction received from the customization engine 102. In this example, the search engine 104 may be one or more domain-specific search engines that perform a vertical search on a specific content domain 116. The search engine 104 may include a focused web crawler that indexes only content that is relevant to a predefined topic or sets of topics. The content domain or the vertical content area may be based on topicality, media type, or genre of content. Common content domains include, but are not limited to, shopping, automotive industry, legal information, medical information, travel, news, technology, politics, etc. It is understood that the search engine 104 may be a general web search engine or a combination of a general web search engine and a domain-specific search engine in other examples.

In this example, the ranking mechanism 202 includes a cross-domain learning module 504 configured to generate a cross-domain ranking model based on training data from at least some heterogeneous content domains 510. The ranking module 502 then ranks the search result from the search engine 104 based on the cross-domain ranking model.

Cross-Domain Ranking Model

In one embodiment, the ranking module 502 may generate a cross-domain ranking model and algorithm for ranking. Learning to rank arises in many information retrieval applications, ranging from web search engine, online advertising, to recommendation system. Traditional ranking mainly focuses on one type of data source, and effective modeling relies on a sufficiently large number of labeled examples, which require expensive and time-consuming labeling process. However, in many real-world applications, ranking over multiple related heterogeneous domains becomes a common situation, where in some domains there may be a relatively large amount of training data, while in some other domains there is very little training data. Therefore, how to leverage labeled information from a related heterogeneous domain to improve ranking in a target domain has become a problem of great interests. In this embodiment, the cross-domain ranking model includes a novel probabilistic, cross-domain ranking model to address this problem. The model learns common latent features for multi-domain data in heterogeneous feature spaces. It is capable of learning homogeneous feature correlation, heterogeneous feature correlation, and label correlation for cross-domain knowledge transfer. The cross-domain ranking model is flexible to adopt various distributional assumptions. This model also includes a stochastic gradient based algorithm, which facilitates distributed optimization and handles missing vales. The model and algorithm show success on site search ranking in comparison current production model and GOOGLE site search.

Model

For ease of explanation and to avoid notational clutter, two terms, target domain and source domain, are used to distinguish two given domains in a transfer learning task, though the discussions in this example are applicable to the situation that two domains are exchangeable and mutually helpful and can also be easily extended to multiple domains. Staring from notations, the target domain data exist in a $d_t+d_c$ dimension space and the source domain data exist in a $d_s+d_c$ dimension space, where $d_c$ is the number of dimensions for their overlapped feature space (denoted as $S^c$), $d_t$ and $d_s$ are the number of dimensions for their dedicated feature spaces (denoted as $S^t$ and $S^d$), respectively. For traditional homogeneous transfer learning, all data are in the same feature space, i.e., $d_t=0$ and $d_s=0$. For totally heterogeneous transfer learning, the feature spaces for the different domains have no overlapping, i.e., $d_c=0$. In this example, the most general case—partially overlapped heterogeneous feature spaces, is considered, which arises frequently in real applications.

$n_t$ and $n_s$ denote the numbers of instances in the target domain and the source domain, respectively, $X^{(td)} \in \mathbb{R}^{n_s \times d_t}$ denotes the target domain data in its dedicated feature space, and $X^{(tc)} \in \mathbb{R}^{n_t \times d_c}$ denotes target domain data in the common feature space. Similarly, $X^{(sd)} \in \mathbb{R}^{n_s \times d_s}$ denotes the source domain data in its dedicated feature space, and $X^{(sc)} \in \mathbb{R}^{n_s \times d_c}$ denotes the source domain data in the overlapped feature space. Furthermore, $Y^{(t)} \in \mathbb{R}^{n_t \times p}$ and $Y^{(s)} \in \mathbb{R}^{n_s \times p}$ denote the labels for the target and source domain data, respectively, where p is the dimension of the label spaces and a label can be multi-dimensional.

In heterogeneous transfer learning, given target domain data, $X^{(td)}$, $X^{(tc)}$, and $Y^{(t)}$, and source domain data, $X^{(sd)}$, $X^{(sc)}$, and $Y^{(s)}$, they are three types of domain difference to impede directly applying source domain data to the target domain: different dedicated feature spaces; different feature distributions for common features; different label distributions.

On the other hand, three types of domain correlations need to be identified for knowledge transfer. The first one is homogeneous feature correlation hidden in the overlapped feature space, i.e., correlation between $X^{(tc)}$ and $X^{(sc)}$, which is the focus of traditional homogeneous transfer learning. The second one is heterogeneous feature correlation hidden in the dedicated feature spaces, i.e., correlation between $X^{(td)}$ and $X^{(sd)}$. The third one is label correlation hidden in the output label faces, i.e., the correlation between $Y^{(t)}$ and $Y^{(s)}$.

As noted above, feature-based transfer learning is desirable direction for this scenario. If those correlations (common knowledge) are extracted into a set of common latent factors (features) for the two domains, then the source domain data with the common latent features can be directly applied to the target domain. This model is a generative model. Specifically, the model assumes that both of the target domain's features and labels are generated conditioning on the target domain latent factor $Z^{(t)} \in \mathbb{R}^{n_t \times k}$; similarly both of the source domain's features and labels are generated conditioning on the source domain latent features $Z^{(s)} \in \mathbb{R}^{n_s \times k}$. The model is designed to learn $Z^{(t)} \in \mathbb{R}^{n_t \times k}$ and $Z^{(t)} \in \mathbb{R}^{n_t \times k}$ with maximum do main correlations and minimum domain differences.

To make latent factors be flexible to catch different types of correlations, the latent factors have two components such that $$Z^{(t)}=[Z^{(td)} Z^{(tc)}] \qquad (1)$$

and $$Z^{(s)}=[Z^{(sd)} Z^{(sc)}] \qquad (2),$$

where $Z^{(tc)} \in \mathbb{R}^{n_t \times k_c}$ and $Z^{(sc)} \in \mathbb{R}^{n_s \times k_c}$ are latent factors for the two domain to mainly catch homogeneous feature correlations; $Z^{(td)} \in \mathbb{R}^{n_t \times k_d}$ and $Z^{(sd)} \in \mathbb{R}^{n_s \times k_d}$ are latent features for the two domains to mainly catch homogeneous feature correlations.

Generate common features: The common features of the target domain and source domain in the shared feature space are generated according to the following probabilities:

$$p(X_{ij}^{(tc)}|f(Z_i^{(tc)})) \qquad (3)$$

$$p(X_{ij}^{(sc)}|f(Z_i^{(sc)})), \qquad (4)$$

where $f(:)$ is a link function. In this example, the linear function space for $f(:)$ and the most popular distribution, normal distribution, are considered for p. Hence, the following formulations for common features are obtained:

$$X_{ij}^{(tc)}|Z_i^{(tc)} \sim N(Z_i^{(tc)} P_j^{(c)}, \sigma_{tc}^2) \qquad (5)$$

$$X_{ij}^{(sc)}|Z_i^{(sc)} \sim N(Z_i^{(sc)} P_j^{(c)}, \sigma_{sc}^2) \qquad (6),$$

where $P^{(c)} \in \mathbb{R}^{n_c \times k_c}$ is a shared basis matrix for the two domains. Without loss of generality, the same variance $\sigma_{tc}^2$ for all $X_{ij}^{(tc)}$ and $\sigma_{sc}^2$ for all $X_{ij}^{(sc)}$ is assumed. Formulations (5) and (6) then may be rewritten into full matrix format as follows:

$$X^{(tc)}|Z^{(tc)} \sim N(Z^{(tc)} P^{(c)}, \sigma_{tc}^2 I) \qquad (7)$$

$$X^{(sc)}|Z^{(sc)} \sim N(Z^{(sc)} P^{(c)}, \sigma_{sc}^2 I), \qquad (8)$$

where I is an identity matrix. Based on formulations (5) and (6), the features of the two domains in the shared feature space are generated according to their latent factors with the same basis matrix P(c), which transfers knowledge cross the domains. Furthermore, a prior distribution for P(c) is assumed to reduce over fitting. In this example, the standard normal distribution, i.e., P(c) is generated as follows:

$$P^{(c)} \sim N(0, \lambda_{sc}^2 I), \quad (9)$$

Generate dedicated features: Similarly, the dedicated features of the target domain and source domain in the heterogeneous feature spaces are generated according to the following probabilities:

$$p(X^{(td)}|h(Z^{(td)})) \quad (10)$$

$$p(X^{(sd)}|h(Z^{(sd)})) \quad (11),$$

where h(:) is a link function. Similarly, with linear link function and normal distribution assumption, the following conditional probabilities for dedicated features are obtained:

$$X^{(td)}|Z^{(td)} \sim N(Z^{(td)} P^{(td)}, \sigma_{td}^2 I) \quad (12)$$

$$X^{(sd)}|Z^{(sd)} \sim N(Z^{(sd)} P^{(sd)}, \sigma_{sd}^2 I), \quad (13),$$

where $P^{(td)} \in \mathbb{R}^{k_d \times d_{td}}$ and $P^{(sd)} \in \mathbb{R}^{k_d \times d_{sd}}$ are two basis matrices for target domain dedicated features and source domain dedicated features, respectively. Similarly, the standard normal distribution is assumed as the prior distribution for P(td) and P(td) as follows, $$P^{(td)} \sim N(0, \lambda_{td}^2 I), \quad (14)$$

$$P^{(sd)} \sim N(0, \lambda_{sd}^2 I), \quad (15),$$

In general, it is not realistic to assume that dedicated features from heterogeneous feature spaces to share one basis matrix, especially when the dimensions of two feature spaces, $d_t d$ and $d_s d$, are different. Hence, in generative process of dedicated features, there is no direct knowledge transfer via a shared basis matrix. Instead, an indirect knowledge transfer through the interaction between the dedicated features and the common features and the interaction between the dedicated features and the labels is enforced, which are modeled in the generative process of the labels.

Generate labels: The labels of the target domain and source domain are generated according to the following probabilities:

$$p(Y^{(t)}|e(Z^{(td)}, Z^{(tc)})) \quad (16)$$

$$p(Y^{(s)}|e(Z^{(sd)}, Z^{(sc)})), \quad (17),$$

where e(:) is a link function. With linear link function and normal distribution assumption, the following conditional probabilities for the labels are obtained:

$$Y^{(t)}|Z^{(td)}, Z^{(tc)} \sim N(Z^{(td)} W^{(d)} + Z^{(tc)} W^{(c)}, \sigma_{yt}^2 I) \quad (18)$$

$$Y^{(s)}|Z^{(sd)}, Z^{(sc)} \sim N(Z^{(sd)} W^{(d)} + Z^{(sc)} W^{(c)}, \sigma_{ys}^2 I), \quad (19),$$

Hence, in each domain, the labels are linearly determined by both dedicated latent factors and common latent factors. To simply the formulation, assuming $$W = \begin{bmatrix} W^{(d)} \\ W^{(c)} \end{bmatrix}. \quad (20)$$

Substituting equations (1), (2) and (20) into equations (21) and (22), the simpler expressions are obtained as follows:

$$Y^{(t)}|Z^{(t)} \sim N(Z^{(t)} W, \sigma_{yt}^2 I) \quad (21)$$

$$Y^{(s)}|Z^{(s)} \sim N(Z^{(s)} W, \sigma_{ys}^2 I), \quad (22),$$

From formulations (21) and (22), it is more clearly to see that the common linear coefficient matrix W connects the label generating for the target and source domains and is the bridge for knowledge transfer. Similarly, the standard normal distribution is used as the prior distribution for W as follows:

$$W^{(-)} \sim N(0, \lambda_w^2 I), \quad (23),$$

Figure 8:
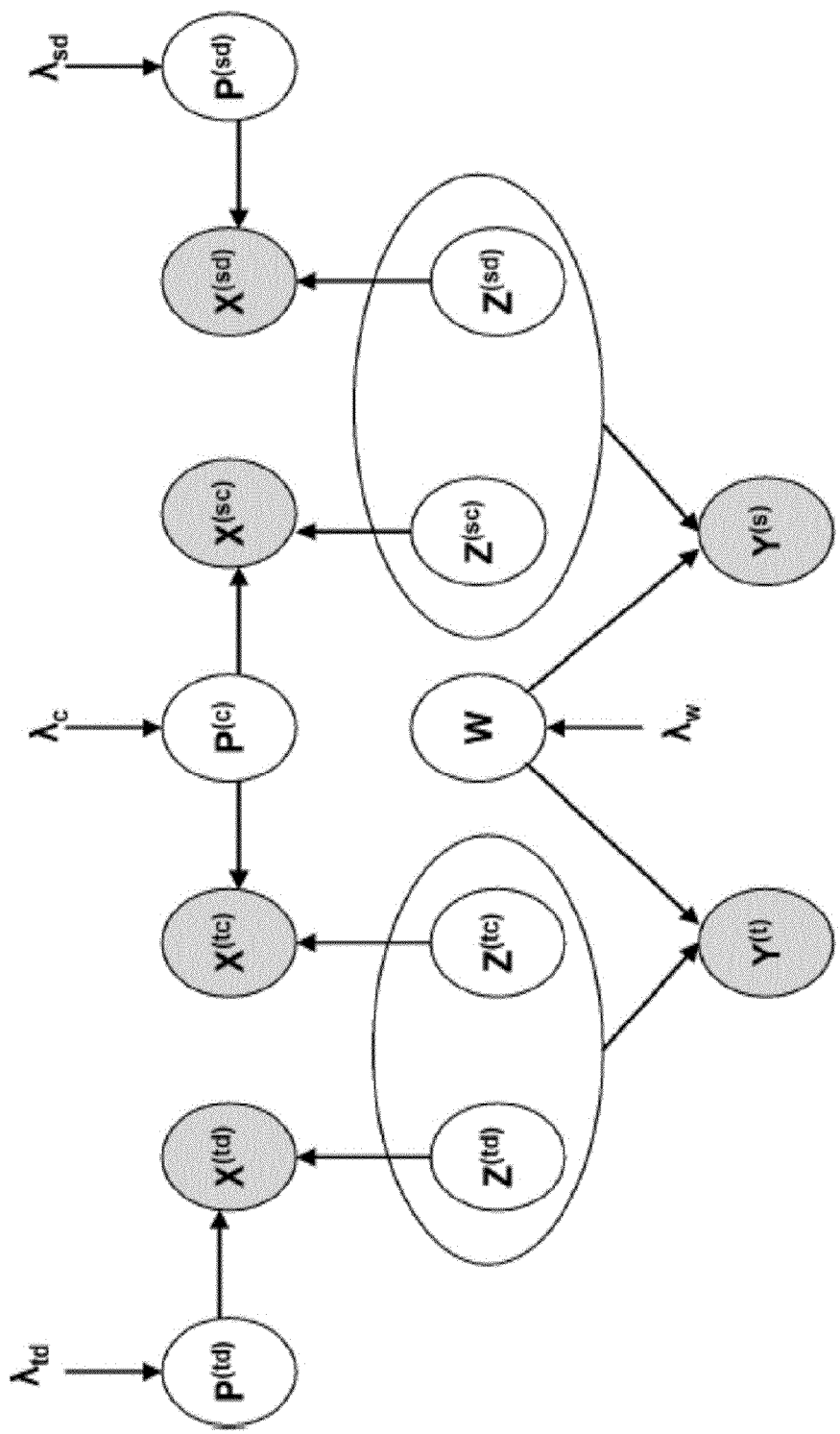
FIG. 8 is a depiction of an exemplary Bayesian network for a cross-domain ranking model, according to an embodiment of the present teaching.

FIG. 8 shows the Bayesian network for cross-domain ranking model. In summary, the cross-domain ranking model's three generative processes have their own focuses and are connected by the latent factors Z, which propagate the information among the three generative processes. Through both direct and indirect knowledge transfer, the latent factors catch the three different types of domain correlations.

Algorithm Derivation

In this example, the algorithm to learn the parameters for the cross-domain ranking model is derived. The problem of minimizing the negative log posterior of the cross-domain ranking model boils down to the following objective:

$$\min \sum_{i=tc,sc} \left( \frac{1}{\sigma_i^2} \|X^{(i)} - Z^{(i)} P^{(c)}\|^2 \right) + \frac{1}{\lambda_c^2} \|P^{(c)}\|^2 + \quad (24)$$

$$\sum_{i=td,sd} \left( \frac{1}{\sigma_i^2} \|X^{(i)} - Z^{(i)} P^{(i)}\|^2 + \frac{1}{\lambda_i^2} \|P^{(i)}\|^2 \right) +$$

$$\sum_{i=t,s} \left( \frac{1}{\sigma_{yi}^2} \|Y^{(i)} - Z^{(i)} W\|^2 \right) + \frac{1}{\lambda_w^2} \|W\|^2).$$

Minimizing formulation (24) is a non-convex problem. A stochastic gradient descent algorithm is used to solve it. The algorithm is computationally efficient and is easy to decouple observations for distributed computation. The algorithm loops over all the observations and updates the parameters by moving in the direction defined by negative gradient. For example, for each $X_{ij}^{(td)}$, the ith row of Z(td) and jth column of P(td) are updated as follows (here, the notation is abused to allow a scalar to add to each dimension of a vector), $$Z_{i.}^{(td)} = Z_{i.}^{(td)} - \quad (25)$$
$$\gamma \left( \left( \frac{2}{\sigma_{td}^2} (X_{ij}^{(td)} - Z_{i.}^{(td)} P_{.j}^{(td)})(-P_{ij}^{(td)}) \right) - \left( \frac{2}{\sigma_t^2} (Y_{i.}^{(t)} - Z_{i.}^{(t)} W)(-W^{(d)} 1) \right) \right)$$

$$P_{.j}^{(td)} = P_{.j}^{(td)} - \gamma \left( \left( \frac{2}{\sigma_{td}^2} (X_{ij}^{(td)} - Z_{i.}^{(td)} P_{.j}^{(td)})(-Z_{ij}^{(td)}) \right) + \frac{2}{\lambda_{td}^2} P_{.j}^{(td)} \right), \quad (26)$$

where γ is the learning rate. Similarly, for each $X_{ij}^{(sd)}$, the ith row of Z(sd) and jth column of P(sd) are updated as follows:

$$Z_{i.}^{(sd)} = Z_{i.}^{(sd)} - \quad (27)$$
$$\gamma \left( \left( \frac{2}{\sigma_{sd}^2} (X_{ij}^{(td)} - Z_{i.}^{(sd)} P_{.j}^{(sd)})(-P_{ij}^{(sd)}) \right) - \left( \frac{2}{\sigma_s^2} (Y_{i.}^{(s)} - Z_{i.}^{(s)} W)(-W^{(s)} 1) \right) \right)$$

$$P_{.j}^{(sd)} = P_{.j}^{(sd)} - \gamma \left( \left( \frac{2}{\sigma_{sd}^2} (X_{ij}^{(sd)} - Z_{i.}^{(sd)} P_{.j}^{(sd)})(-Z_{ij}^{(sd)}) \right) + \frac{2}{\lambda_{sd}^2} P_{.j}^{(sd)} \right), . \quad (28)$$

The stochastic gradient descent based algorithm in this example has two desirable properties. First, it is ready for distributed optimization based on the Hadoop MapReduce framework. The basic idea is to decompose the objective in formulation (24) by optimizing with respect the observation $X_{ij}^{(\cdot)}$ or pseudo observation $Z_{ij}^{(\cdot)}$ independently in the Map phase, and to combine the estimation for $Z_i^{(\cdot)}$ and $P_j^{(\cdot)}$, in the Reduce phase. Second, it naturally allows missing values in the observations, either in X or Y.

Result

Hinet in Taiwan: comparing with production with Vespa Native Ranking algorithm, DCG5 of using the cross-domain ranking model improves by 43.71%, DCG1 of using the cross-domain ranking model improves by 51.65%; comparing with Google with Googlears domain search result, DCG5 of using the cross-domain ranking model beats Google by 16.82%, and DCG1 of using the cross-domain ranking model beats Google by 15.58%.

Deccan Herald in India: comparing with production with Vespa Native Ranking algorithm, DCG5 of using the cross-domain ranking model improves by 87.36%, DCG1 improves 89.57%; comparing with Google with Googlears domain search result, DCG5 of using the cross-domain ranking model beats Google by 34.15%, DCG1 of using the cross-domain ranking model beats Google by 27.66%.

By using the cross-domain ranking model, it is capable of capturing different types of domain correlation cross heterogeneous domains, homogeneous feature correlation, heterogeneous feature correlation, and label correlation. The cross-domain ranking model is also applicable to various applications with different data distribution assumptions and is flexible for both homogeneous transfer learning and heterogeneous transfer learning.

Dynamic Prediction Model

Referring back to FIG. 5, the dynamic prediction module 506 in this example is configured to generate a dynamic prediction model based on data associated with one or more previous search results collected within a dynamic time frame and to compute predicted data based on the dynamic prediction model. The ranking module 502 then ranks a search result based on the predicted data.

In one embodiment, the dynamic prediction model is a transaction window based dynamic liner regression (TWDLR) model. Although in this example, the dynamic prediction model is described in the context of best-selling prediction based shopping ranking promotion, this model may be applied to any suitable web site customization and/or search result ranking. The traditional moving time window based approach does not work well due to the large transaction (signals) variation among the large amount of times, i.e., given a time window such as 10 days, some items may have a lot of transactions and some items may have very few transaction. The TWDLR model includes a concept of transaction window, i.e., to predict the next daily transaction window, the model uses the data from last k transaction days. A transaction day for an item is defined as a day in which there is at least one transaction for this item.

The first derivative feature for a time at ith transaction day can be efficiently computed as follows:

$$x_i = \frac{2.0(s_i - s_{i-1})}{(s_i + s_{i-1})(d_i - d_{i-1})}, \quad (29)$$

where $x_i$ denotes the feature ith transaction day; $s_{i-1}$ denotes the number of transaction at (i-1)th transaction day; $s_i$ denotes the number of transaction at ith transaction day; $d_{i-1}$ denotes the date for (i-1)th transaction day, i.e., $d_i - d_{i-1}$ denotes how many days between ith transaction day and (i-1)th transaction day.

The dynamic prediction model predicts the number of transactions for the next day by using a window of k transaction days as follows:

$$s_{k+1} = \left(1 + \sum_{i=1}^{k} \alpha_i x_i / (d_{k+1} - d_k)\right) s_k, \quad (30)$$

where $s_{k+1}$ is the number of transaction predicted for the day $d_{k+1}$; $x_i$ is the feature for the last i transaction day; $\alpha_i$ is the model parameter learned from the training data; $s_k$ is the number of transaction at the most recent transaction day $d_k$.

In one example, the dynamic prediction model with k=8 provide the best performance for off-line experiments:

$a=$[0.014431710 051114777 0.03031198 0.10456019 0.15791748 0.0244509 0.05200826 0.0536975].

Assuming that there are 6 transactions in the time order for an item as format (d, s), i.e., day, # of transactions): (15078, 2) (15082, 2) (15093, 3) (15103, 3) (15115, 1) (15118, 2). Generate Features:

*$x\_1$=0,$x\_2$=0,$x\_3$=0,$x\_4$=2*(2-2)/((2+2)*(15082-15078)),$x\_5$=2*(3-2)/((3+2)(15093-15082)), ... ,$x\_8$=2*(2-1)/((2+1)(15118-15115)).

Predict the number of transaction at day 15119:

$s$=(1+(0.01443171*$x\_1$+0.05111477*$x\_2$+ 0.03031198*$x\_3$+0.10456019*$x\_4$+ 0.15791748*$x\_5$+0.0244509*$x\_6$+ 0.05200826*$x\_7$+0.0536975*$x\_8$)/(15119-15118))*2

The performance of the dynamic prediction model may be evaluated by traditional mean squared error (MSE) or proposed discounted cumulative transaction (DCT)

$$DCT_p = \sum_{j=1}^{p} \frac{2^{\bar{s}_j} - 1}{\log_2(1+j)}, \quad (31)$$

where $\bar{s}$ is the predicted transaction number for the item at the position j and the position of the items are based on the true transaction number.

In one example, the experimental result evaluated by MSE is illustrated in FIG. 9, which shows a great improvement of using the dynamic prediction model compared with the traditional time window based moving average method.

After getting the predicted number, the search result ranking may be adjusted so that the time with higher selling probabilities are ranked higher and the ranking relevance is not hurt. In the first step, the dynamic prediction model is used to predict selling number (pred_selling field in indexing) for Product_i based on sales history data. In the second step, the selling prediction value from step 1 is used to do adjusting ranking order as illustrated in an example below:

set m=30
set \beta=0.05 (?)
For item i at ranking position 1, 2, 3, 4, 5, ..., m (by MLR):
  mlr_score_i=MLR(item i)
  boost_i=pred_selling(Item i)
  final_ranking_score_i=mlr_score_i+\beta*boost_i
Re-rank the m items based on final_ranking_score values.

The dynamic prediction model works for a large amount of items cross different stores. The dynamic prediction model is capable of handling very sparse data and provides efficient dynamic feature computation for frequently updates. It is understood that the dynamic prediction module 506 may apply the dynamic prediction model to the search result ranking in any other suitable content domain in addition to shopping and product selling prediction.

Referring back to FIG. 5, the user ranking customization module 508 in this example is configured to adjust ranking of a search result via a customizable component based on instruction. The customizable component relates to a scheme by which items in a search result associated with the web site are to be ranked (e.g., the ranking scheme component). In other words, a specific customizable component of the customization engine 102 may correspond to the ranking mechanism 202.

Figure 6:
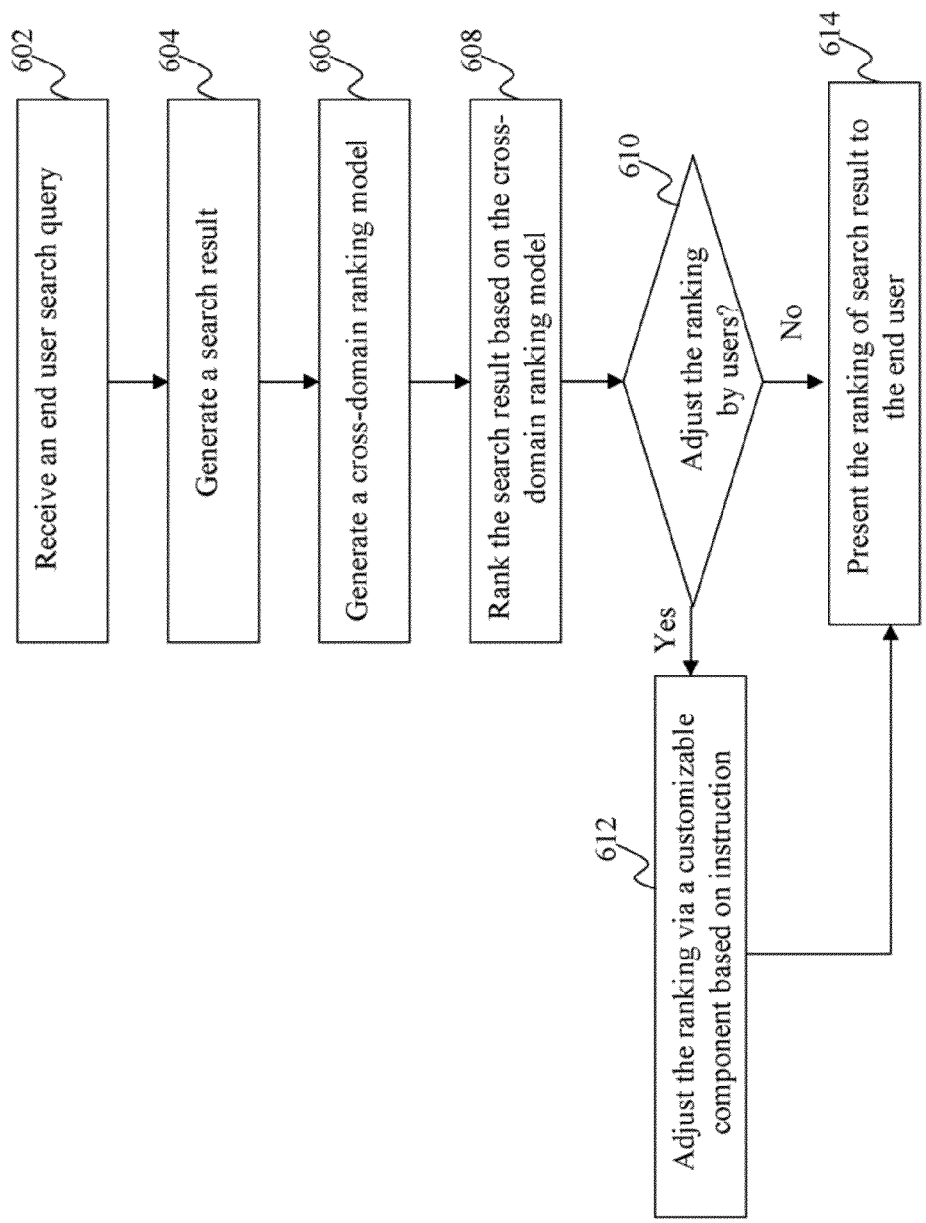
FIGS. 6(a) and 6(b) are flowcharts of exemplary processes of customizing ranking of a search result, according to different embodiments of the present teaching.
Figure 6:
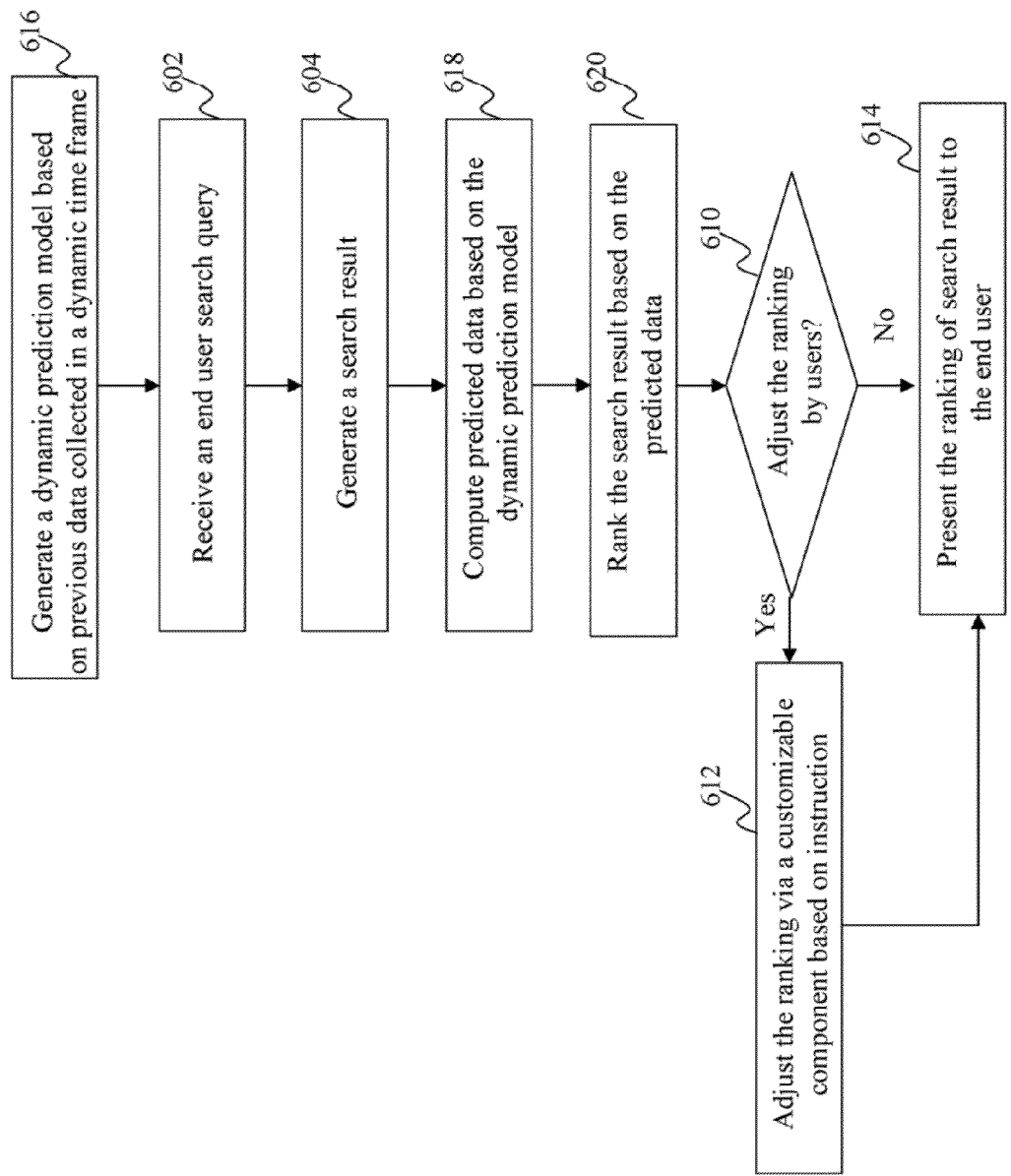

FIGS. 6(a) and 6(b) are flowcharts of exemplary processes in which the ranking of a search result is performed and customized, according to different embodiments of the present teaching. In FIG. 6(a), the search result in response to an end user's search query is ranked based on the cross-domain ranking model. The ranking may be adjusted (customized) by users via a customizable component based on instruction as noted above. It will be described with reference to the above figures. However, any suitable module or unit may be employed. Beginning at block 602, an end user's search query is received, for example, by the search engine 104. Moving to block 604, a search result having a plurality of items is generated by the search engine 104. At block 606, a cross-domain ranking model is generated, for example, by the cross-domain learning module 504 based on the training data from the heterogeneous content domains 510. Moving to block 608, the search result is ranked based on the cross-domain ranking model, for example, by the ranking module 502. At block 610, whether the ranking needs to be adjusted by users is determined. If the ranking needs to be adjusted, at block 612, the ranking is adjusted by the users via a customizable component based on a customizing instruction. Nevertheless, at block 614, the ranking of search results, either adjusted or un-adjusted, is presented to the end user.

In FIG. 6(b), the search result in response to an end user's search query is ranked based on the dynamic prediction model. The ranking may also be adjusted (customized) by users via a customizable component based on instruction as noted above. The dynamic prediction model may be generated offline, i.e., before a user submits a search query. When another user submits query, this model may be directly applied for ranking. It will be described with reference to the above figures. However, any suitable module or unit may be employed. Beginning, at block 616, a dynamic prediction model is generated based on previous data collected in a dynamic time frame, for example, by the dynamic prediction module 506. At block 602, an end user's search query is received, for example, by the search engine 104. Moving to block 604, a search result having a plurality of items are generated by the search engine 104. At block 618, predicted data is computed based on the dynamic prediction model, for example, by the dynamic prediction module 506. At block 620, the search result is ranked based on the predicted data, for example, by the ranking module 502. At block 610, whether the ranking needs to be adjusted by users is determined. If the ranking needs to be adjusted, at block 612, the ranking is adjusted by the users via a customizable component based on a customizing instruction. Nevertheless, at block 614, the ranking of search results, either adjusted or un-adjusted, is presented to the end user.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 7:
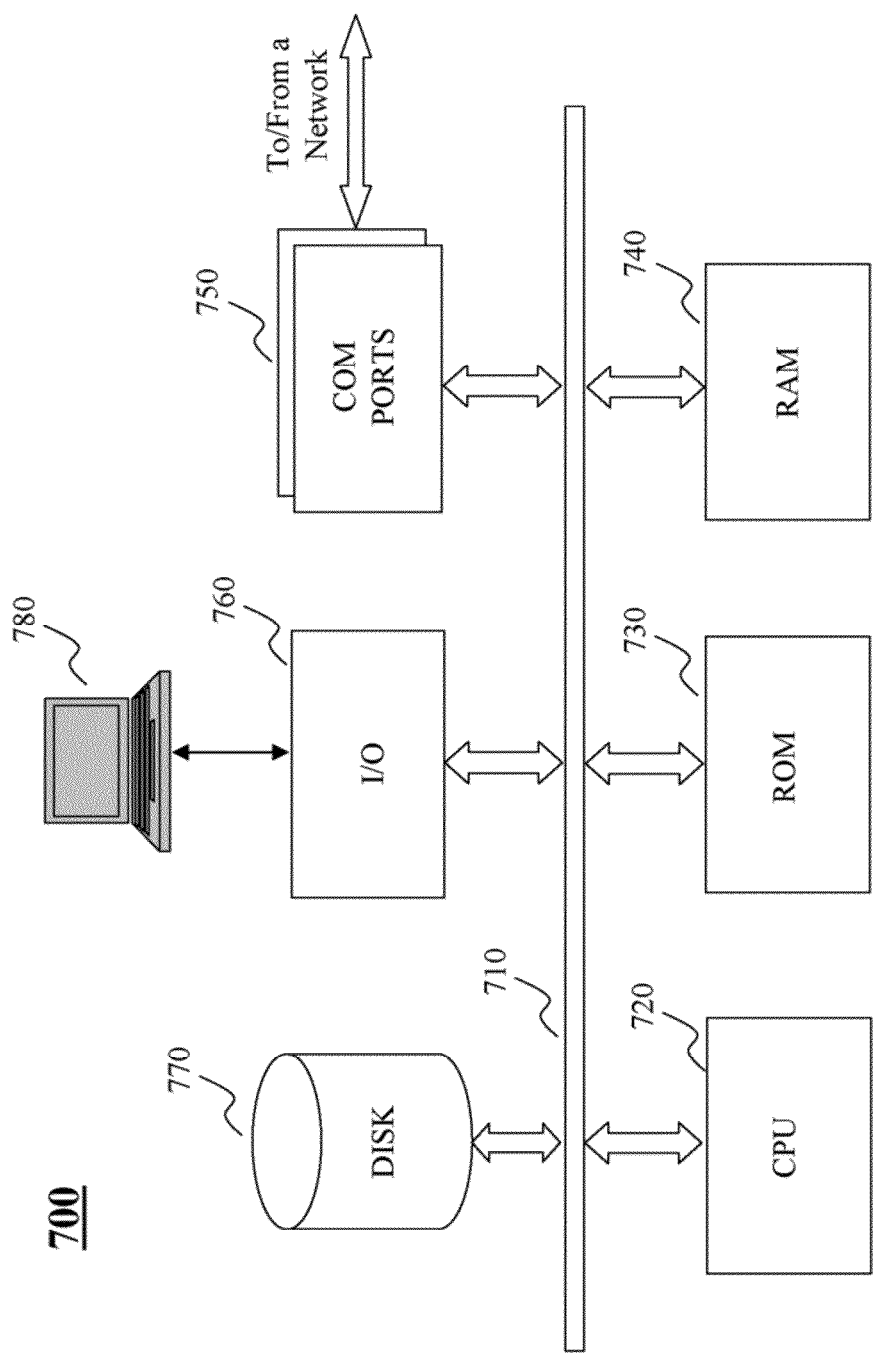
FIG. 7 depicts a general computer architecture on which the present teaching can be implemented.

FIG. 7 depicts a general computer architecture on which the present teaching can be implemented and has a functional block diagram illustration of a computer hardware platform that includes user interface elements. The computer may be a general-purpose computer or a special purpose computer. This computer 700 can be used to implement any components of the web site customization architecture as described herein. Different components of the system, e.g., as depicted in FIGS. 1 and 2, can all be implemented on one or more computers such as computer 700, via its hardware, software program, firmware, or a combination thereof. Although only one such computer is shown, for convenience, the computer functions relating to web site customization may be implemented in a distributed fashion on a number of similar platforms, to distribute the processing load.

The computer 700, for example, includes COM ports 702 connected to and from a network connected thereto to facilitate data communications. The computer 700 also includes a central processing unit (CPU) 704, in the form of one or more processors, for executing program instructions. The exemplary computer platform includes an internal communication bus 706, program storage and data storage of different forms, e.g., disk 708, read only memory (ROM) 710, or random access memory (RAM) 712, for various data files to be processed and/or communicated by the computer, as well as possibly program instructions to be executed by the CPU. The computer 700 also includes an I/O component 714, supporting input/output flows between the computer and other components therein such as user interface elements 716. The computer 700 may also receive programming and data via network communications.

Hence, aspects of the method of web site customization, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a machine having at least one processor, storage, and a communication platform connected to a network for customizing a web page, comprising:
   receiving a search query submitted by an end user;
   identifying a user for customizing the web page to be provided to the end user in response to the search query;
   determining a type of the user;
   determining a control scope over the web page based on the type of the user;
   determining one or more customizable components of the web page based on the control scope;
   providing a customization instruction with respect to a specific customizable component based on an input from the user, wherein the customization instruction is to be used to customize the specific customizable component of the web page;
   generating a cross-domain ranking model based on training data from a plurality of heterogeneous content domains, wherein the cross-domain ranking model learns common latent features from the plurality of heterogeneous content domains and includes a stochastic gradient based algorithm for facilitating distributed optimization and handling missing values; and
   ranking a search result based on the cross-domain ranking model and the customization instruction.

2. The method of claim 1, wherein the one or more customizable components of the web page include at least one category of:
   appearance of a user interface associated with the web page;
   scheme in which search results associated with the web page are to be ranked;
   scope associated with a web page; and
   functionalities which can be customized.

3. The method of claim 1, wherein the user is at least one of:
   a host of the web page;
   a content provider offering content through the web page;
   a service provider that provides search service on the web page;
   an end user viewing content on the web page; and
   an end user searching for content on the web page.

4. The method of claim 3, wherein the customizable components for each type of user vary.

5. The method of claim 1, wherein a representation corresponding to a customizable component is provided to the user and includes one or more selectable choices, each of which represents one way to customize the customizable component.

6. The method of claim 5, wherein the input from the user corresponds to a selected choice made by the user as to how to customize the specific customizable component.

7. The method of claim 1, further comprising providing the web page to the user in accordance with the customization instruction so that the specific customizable component is customized based on the input from the user.

8. The method of claim 1, further comprising transmitting the customization instruction to a destination where the web page is rendered with customization in accordance with the customization instruction.

9. The method of claim 2, wherein the category of scheme in which search results associated with the web page are to be ranked includes revising an existing ranking derived with respect to an item included in a search result.

10. The method of claim 2, wherein the category of appearance of a user interface associated with the web page includes at least one of:
   color scheme of the web page;
   font scheme of the web page;
   format of the web page; and
   language of the web page.

11. The method of claim 2, wherein
   the category of scope associated with a web page includes content scope and search scope;
   the content scope includes one or more content sources on the web page; and
   the search scope includes one or more content domains serving as source of content for search through the web page.

12. The method of claim 2, wherein the category of functionalities which can be customized includes at least one of:
   a search suggestion;
   a first search result that is considered to relate to a second search result;
   a capability of customizing a subspace on the web page;
   a search result filtered based on one or more criteria;
   a sponsored link and/or a paid inclusion; and
   promotion displayed on the web page.

13. The method of claim 1, further comprising:
generating a dynamic prediction model based on data associated with one or more previous search results collected within a dynamic time frame;
computing predicted data based on the dynamic prediction model; and
ranking a search result based on the predicted data.

14. The method of claim 1, further comprising adjusting ranking of a search result via a customizable component based on the customization instruction, wherein the customizable component relates to a scheme by which items in a search result associated with the web page are to be ranked.

15. A method implemented on a machine having at least one processor, storage, and a communication platform connected to a network for customizing a web page, comprising:
receiving a search query submitted by an end user;
identifying a user for customizing the web page to be provided to the end user in response to the search query;
determining a type of the user;
determining a control scope over the web page based on the type of the user;
determining one or more customizable components of the web page based on the control scope; and
sending information associated with the one or more customizable components to the user;
obtaining a customization instruction generated based on an input from the user, wherein the customization instruction is directed to a specific customizable component of the web page;
providing the web page to the user in accordance with the customization instruction so that the specific customizable component is customized based on the input from the user;
generating a cross-domain ranking model based on training data from a plurality of heterogeneous content domains, wherein the cross-domain ranking model learns common latent features from the plurality of heterogeneous content domains and includes a stochastic gradient based algorithm for facilitating distributed optimization and handling missing values; and
ranking a search result based on the cross-domain ranking model and the customization instruction.

16. A system having at least one processor, storage, and a communication platform connected to a network for customizing a web page, comprising:
a user input analyzer configured to:
receive a search query submitted by an end user,
identify a user for customizing the web page to be provided to the end user in response to the search query,
determine a type of the user,
determine a control scope over the web page based on the type of the user,
determine one or more customizable components of the web page based on the control scope, and
receive an input entered by the user and directed to a specific customizable component of the web page; and
a customizing instruction generator configured to
generate a customization instruction with respect to the customizable component, wherein the customization instruction is to be used to customize the specific customizable component of the web page,
wherein the specific customizable component corresponds to a ranking mechanism that comprises:
a cross-domain learning module configured to generate a cross-domain ranking model based on training data from a plurality of heterogeneous content domains, wherein the cross-domain ranking model learns common latent features from the plurality of heterogeneous content domains and includes a stochastic gradient based algorithm for facilitating distributed optimization and handling missing values, and
a ranking module operatively coupled to the cross-domain learning module and configured to rank a search result based on the cross-domain ranking model and the customization instruction.

17. The system of claim 16, wherein the one or more customizable components of the web page include at least one category of:
appearance of a user interface associated with the web page;
scheme in which search results associated with the web page are to be ranked;
scope associated with a web page; and
functionalities which can be customized.

18. The system of claim 16, wherein a user is at least one of:
a host of the web page;
a content provider offering content through the web page;
a service provider that provides search service on the web page;
an end user viewing content on the web page; and
an end user searching for content on the web page.

19. The system of claim 18, wherein the customizable components for each type of user vary.

20. The system of claim 16, wherein a representation corresponding to a customizable component is provided to the user and includes one or more selectable choices, each of which represents one way to customize the customizable component.

21. The system of claim 20, wherein the input from the user corresponds to a selected choice made by the user as to how to customize the specific customizable component.

22. The system of claim 16, further comprising a customization unit operatively coupled to the customizing instruction generator, configured to provide the web page to the user in accordance with the customization instruction so that the specific customizable component is customized based on the input from the user.

23. The system of claim 16, wherein the customizing instruction generator is further configured to transmit the customization instruction to a destination where the web page is rendered with customization in accordance with the customization instruction.

24. The system of claim 17, wherein the category of scheme in which search results associated with the web page are to be ranked includes revising an existing ranking derived with respect to an item included in a search result.

25. The system of claim 17, wherein the category of appearance of a user interface associated with the web page includes at least one of:
color scheme of the web page,
font scheme of the web page,
format of the web page, and
language of the web page.

26. The system of claim 17, wherein
the category of scope associated with a web page includes content scope and search scope;
the content scope includes one or more content sources on the web page; and
the search scope includes one or more content domains serving as source of content for search through the web page.

27. The system of claim 17, wherein the category of functionalities which can be customized includes at least one of:
- a search suggestion;
- a first search result that is considered to relate to a second search result;
- a capability of customizing a subspace on the web page;
- a search result filtered based on one or more criteria;
- a sponsored link and/or a paid inclusion; and
- promotion displayed on the web page.

28. The system of claim 16, wherein the specific customizable component corresponds to a ranking mechanism that comprises:
- a dynamic prediction module configured to
  - generate a dynamic prediction model based on data associated with one or more previous search results collected within a dynamic time frame, and
  - computing predicted data based on the dynamic prediction model; and
- a ranking module operatively coupled to the dynamic prediction module, configured to rank a search result based on the predicted data.

29. The system of claim 16, wherein the specific customizable component corresponds to a ranking mechanism that comprises a user ranking customization module configured to adjust ranking of a search result via a customizable component based on the customization instruction, wherein the customizable component relates to a scheme by which items in a search result associated with the web page are to be ranked.

30. A machine-readable tangible and non-transitory medium having information for customizing a web page, wherein the information, when read by the machine, causes the machine to perform the following:
- receiving a search query submitted by an end user;
- identifying a user for customizing the web page to be provided to the end user in response to the search query;
- determining a type of the user;
- determining a control scope over the web page based on the type of the user;
- determining one or more customizable components of the web page based on the control scope;
- providing a customization instruction with respect to a specific customizable component based on an input from the user, wherein the customization instruction is to be used to customize the specific customizable component of the web page;
- generating a cross-domain ranking model based on training data from a plurality of heterogeneous content domains, wherein the cross-domain ranking model learns common latent features from the plurality of heterogeneous content domains and includes a stochastic gradient based algorithm for facilitating distributed optimization and handling missing values; and
- ranking a search result based on the cross-domain ranking model and the customization instruction.

* * * * *